US012745106B2

(12) United States Patent
Thorat et al.

(10) Patent No.: US 12,745,106 B2
(45) Date of Patent: Sep. 22, 2026

(54) GEOSPATIAL UAV MOBILITY MANAGEMENT

(71) Applicant: International Business Machines Corporation, Armonk, NY (US)

(72) Inventors: Pankaj Thorat, Bangalore (IN); Praveen Jayachandran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 18/509,549

(22) Filed: Nov. 15, 2023

(65) Prior Publication Data

US 2025/0159498 A1 May 15, 2025

(51) Int. Cl.
*H04W 24/02* (2009.01)
*G08G 5/32* (2025.01)
(Continued)

(52) U.S. Cl.
CPC .............. *H04W 24/02* (2013.01); *G08G 5/32* (2025.01); *G08G 5/55* (2025.01); *G08G 5/57* (2025.01); *H04W 64/003* (2013.01)

(58) Field of Classification Search
CPC .. G08G 5/55; G08G 5/57; G08G 5/26; G08G 5/22; G08G 5/59; G08G 5/21; G08G 5/32; G08G 5/34; G08G 5/80; H04W 48/18; H04W 24/02; H04W 60/00; H04W 24/04; H04W 36/322; H04W 4/40; H04W 48/06; H04W 76/11; H04W 8/02; H04W 84/06; H04W 16/02; H04W 24/08; H04W 28/26; H04W 36/0011; H04W 36/0061; H04W 36/008375; H04W 36/13; H04W 36/328; H04W 4/024; H04W 4/029; H04W 48/00; H04W 72/21; H04W 72/543; H04W 8/08;
(Continued)

(56) References Cited

U.S. PATENT DOCUMENTS

| | | | |
|---|---|---|---|
| 11,166,212 | B2 | 11/2021 | Kumar |
| 11,322,031 | B2 | 5/2022 | Boland |

(Continued)

OTHER PUBLICATIONS

Hedman, P. et al, "Content for TS 23.502 Word Version: 18.2.0." Inside TS 23.502: 5GS Registration Procedures, www.tech-invite.com/3m23/toc/tinv-3gpp-23-502_b.html. Accessed Aug. 18, 2023.

(Continued)

*Primary Examiner* — Matthew C Sams
(74) *Attorney, Agent, or Firm* — David K. Mattheis

(57) ABSTRACT

A computer system, computer readable storage medium, and computer-implemented method for enhancing geospatial mobility management of unmanned aerial vehicles (UAVs). The method includes generating a mapping between a UAV designator and a plurality of geospatial region designators. The method also includes instantiating a network slice. The network slice is associated with the UAV designator and the plurality of geospatial region designators. The method further includes generating a flight path for a UAV through a plurality of geospatial regions that is at partially determined subject to the network slice and the plurality of geospatial region designators. The method also includes executing a transit of the UAV through the flight path.

20 Claims, 9 Drawing Sheets

(51) Int. Cl.
*G08G 5/55* (2025.01)
*G08G 5/57* (2025.01)
*H04W 64/00* (2009.01)

(58) Field of Classification Search
CPC ....... H04W 8/12; H04W 8/20; H04W 84/042; B64U 2101/30; B64U 2201/10; B64U 10/13; B64U 10/14; B64U 2101/20; B64U 2101/26; B64U 2101/64; B64U 2201/104; B64U 2201/20
See application file for complete search history.

(56) References Cited

U.S. PATENT DOCUMENTS

| | | | | |
|---|---|---|---|---|
| 11,909,500 | B2 * | 2/2024 | Kim | H04B 7/18506 |
| 12,156,049 | B2 * | 11/2024 | Majjiga | G08G 5/22 |
| 2019/0200285 | A1 * | 6/2019 | Velev | H04W 48/00 |
| 2019/0289613 | A1 * | 9/2019 | Fanelli | H04W 4/029 |
| 2020/0388169 | A1 * | 12/2020 | Barr | G05D 1/101 |
| 2020/0394928 | A1 * | 12/2020 | Neubauer | H04W 36/328 |
| 2022/0075375 | A1 * | 3/2022 | Michini | G05D 1/0088 |
| 2022/0386147 | A1 * | 12/2022 | Majjiga | G08G 5/22 |
| 2023/0147814 | A1 | 5/2023 | Carver | |
| 2024/0031235 | A1 * | 1/2024 | Zhu | H04W 24/02 |
| 2024/0205810 | A1 * | 6/2024 | Majjiga | H04W 48/18 |
| 2024/0244507 | A1 * | 7/2024 | Nayak | H04W 48/06 |

OTHER PUBLICATIONS

Technical Specification—5G; 5G System; Unified Data Repository Services; Stage 3 (3GPP TS 29.504 v15.1.0 Release 15. ETSI TS 129 504 V15.1.0 (Oct. 2018), 26 pgs. https://www.etsi.org/deliver/etsi_ts/129500_129599/129504/15.01.00_60/ts_129504v150100p.pdf <Retrieved Aug. 18, 2023>.

* cited by examiner

5G Control Plane 156

Network Exposure Function (NEF) 158

Unified Data Management (UDM) 162

Policy Control Function (PCF) 172

Nudr Interface 402

Unified Data Repository (UDR) 160

Subscription Data

Policy Data

Structured Data

Application Data

GEOSPATIAL UAV MOBILITY MANAGEMENT

BACKGROUND

The present disclosure relates to user equipment (UE) in communication networks, and, more specifically, toward unmanned aerial vehicles (UAVs) in 5G networks.

Many known communications networks have upgraded to, or are presently upgrading to, a new global wireless standard referred to as the fifth (5th) generation mobile network, typically shortened to "5G." The 5G standard replaces the 1G, 2G, 3G, and 4G standards with technology that is configured to accelerate data speeds, increase reliability and availability, and decrease latencies over the previous standards. For example, for 4G, a range of latencies extends between approximately 60 milliseconds (ms) and 98 ms. In contrast, 5G is configured to have latencies under 5 ms, and in some cases, as low as approximately 1 ms. In addition, 5G is configured to increase data download speeds from approximately 1 gigabit per second (Gbps) for 4G to approximately 10 Gbps for 5G.

SUMMARY

A system, medium, and method are provided for enhancing geospatial mobility management of unmanned aerial vehicles (UAVs).

In one aspect, a computer system for enhancing geospatial mobility management of unmanned aerial vehicles (UAVs) is presented. The system includes one or more processing devices, one or more memory devices communicatively and operably coupled to the one or more processing devices, and a 5G network management tool at least partially resident within the one or more memory devices. The 5G network management tool is configured to generate a mapping between a UAV designator and a plurality of geospatial region designators. The 5G network management tool is further configured to instantiate a network slice. The network slice is associated with the UAV designator and the plurality of geospatial region designators. The 5G network management tool is further configured to generate a flight path for a UAV through a plurality of geospatial regions that is at partially determined subject to the network slice and the plurality of geospatial region designators. The 5G network management tool is also configured to execute a transit of the UAV through the flight path.

In another aspect, a computer readable storage medium is presented. The computer readable storage medium includes computer executable instructions that when executed by at least one computing enhance geospatial mobility management of unmanned aerial vehicles (UAVs). The computer readable storage medium includes instructions to generate a mapping between a UAV designator and a plurality of geospatial region designators. The computer readable storage medium also includes instructions to instantiate a network slice. The network slice is associated with the UAV designator and the plurality of geospatial region designators. The computer readable storage medium further includes instructions to generate a flight path for a UAV through a plurality of geospatial regions that is at partially determined subject to the network slice and the plurality of geospatial region designators. The computer readable storage medium also includes instructions to execute a transit of the UAV through the flight path.

In yet another aspect, a computer-implemented method for enhancing geospatial mobility management of unmanned aerial vehicles (UAVs) is presented. The method includes generating a mapping between a UAV designator and a plurality of geospatial region designators. The method also includes instantiating a network slice. The network slice is associated with the UAV designator and the plurality of geospatial region designators. The method further includes generating a flight path for a UAV through a plurality of geospatial regions that is at partially determined subject to the network slice and the plurality of geospatial region designators. The method also includes executing a transit of the UAV through the flight path.

The present Summary is not intended to illustrate each aspect of every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
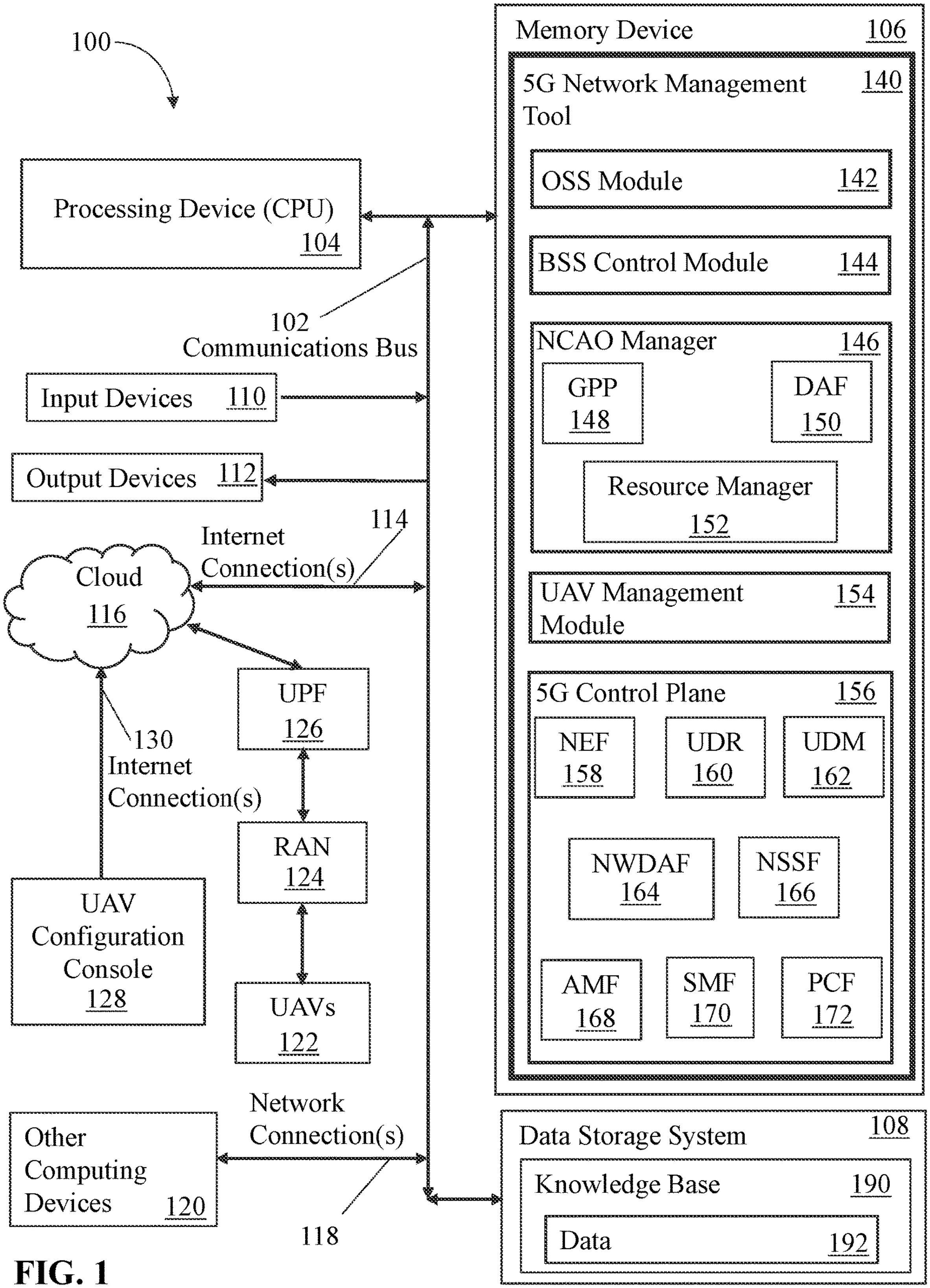
FIG. 1 is a block diagram illustrating a computer system configured to execute operations directed toward enhancing geospatial mobility management of unmanned aerial vehicles (UAVs), in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to implementing a system and method for enhancing geospatial mobility management of unmanned aerial vehicles (UAVs). While the present disclosure is not necessarily limited to such applications, various aspects of the disclosure may be appreciated through a discussion of various examples using this context.

It will be readily understood that the components of the present embodiments, as generally described and illustrated in the Figures herein, may be arranged and designed in a wide variety of different configurations. Thus, the following detailed description of the embodiments of the apparatus, system, method, and computer readable storage medium of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

As used herein, "facilitating" an action includes performing the action, making the action easier, helping to carry the action out, or causing the action to be performed. Thus, by way of example and not limitation, instructions executing on one processor might facilitate an action carried out by semiconductor processing equipment, by sending appropriate data or commands to cause or aid the action to be performed. Where an actor facilitates an action by other than performing the action, the action is nevertheless performed by some entity or combination of entities.

Many known communications networks have upgraded to, or are presently upgrading to, a new global wireless standard referred to as the fifth (5th) generation mobile network, typically shortened to "5G." The 5G standard replaces the 1G, 2G, 3G, and 4G standards with technology that is configured to accelerate data speeds, increase reliability and availability, and decrease latencies over the previous standards. For example, for 4G, a range of latencies extends between approximately 60 milliseconds (ms) and 98 ms. In contrast, 5G is configured to have latencies under 5 ms, and in some cases, as low as approximately 1 ms. In addition, 5G is configured to increase data download speeds from approximately 1 gigabit per second (Gbps) for 4G to approximately 10 Gbps for 5G.

One known technological change from 4G to 5G includes adding new signal transmission devices to the existing signal transmission apparatus. The existing large antenna towers serve as macro cells for the 5G network. The macro cells act as macro base stations that each have a single point of contact with the overall network. These macro cell antennas are referred to as gNodeBs (gNBs) that operate as a node in the respective cellular network that provides connectivity between user equipment (UE) and the 5G core (described further herein).

In the 5G networks, the new signal transmission devices are typically referred to as small cells that facilitate a much greater geographical density than the antenna towers to create a network of much smaller, adjoining cells. In some references, the small cells are referred to as small cell base stations and small cell nodes. In contrast to the towers, some of the small cell nodes have dimensions of approximately 18-inches by 18-inches by 6-inches, where the sizes will vary between manufacturers and with respect to their transmission and receiving specifications. Such specifications include transmission power and radius. The greater density facilitates the higher frequency/lower wavelength 5G transmission. 5G will continue to use many of the existing cell towers for lower frequency transmissions.

One additional known technological change from 4G to 5G includes an expanded utilization of orthogonal frequency-division multiplexing (OFDM) that is a type of digital transmission used in digital modulation for encoding digital (binary) data on multiple carrier frequencies. Such OFDM encoding is used to split different wireless signals into separate channels to avoid interference, which also provides greater bandwidth. Because OFDM encodes data on different frequencies, 4G and 5G download speeds are bolstered. 4G uses a range of frequency channels including approximately 5 megahertz (MHz) to approximately 20 MHz, while 5G uses multiple channels in a range of frequencies of approximately 100 megahertz (MHz) to approximately 800 MHZ.

Moreover, 5G uses a network architecture that enables network slicing through multiplexing of virtualized and independent logical networks on the same physical network infrastructure. Each network slice is a virtually-isolated end-to-end network tailored to fulfill diverse requirements requested by a particular application. Carriers can now unbundle their bandwidth, thereby allowing their customers the capability to choose among different service agreements, including "slices" of different services within those agreements. Built on the aforementioned single physical infrastructure, each slice is a single, virtual end-to-end network of its own, and operators can reserve a slice for a certain customer or application at a specific level of service. One such application of network slicing and the other advanced features of 5G includes facilitating simultaneous and automated operation of the UE such as unmanned aerial vehicles (UAVs) (commonly referred to as "drones") in 5G networks. Generally, the network slices are previously defined and are known artifacts subscribed to by the user.

Some of the known 5G networks support, at least to some degree, UAVs as they transit through the flight path as designated through the slice. In addition to the UAVs, UEs include laptops, phones, pads, etc., and the respective UEs typically travel through the 5G network in two dimensions (through land-based vehicles, on foot, etc.), where in contrast, the UAVs travel in three dimensions. As the UAVs transit through the established flight path, the UAVs will shift from one signal transmission device, i.e., from either a macro cell node or a small cell node to another macro cell node or small cell node.

In many of the known 5G networks, the handoff from one node to another as the UAVs transit their predetermined path is executed through a mobility update procedure that includes the UAVs and the network having existing access to the identity of the next node to facilitate a smooth handoff. As the UAVs transit at their relatively high speeds, they require well-timed transfers from the present node to the next node to facilitate a most expeditious transit of the UAVs with no disruption to the network, or to the transit of the UAVs. In some cases, commercially-available UAVs typically travel at approximately 45 miles-per-hour (mph), where some military drones exceed three times that velocity. Therefore, geospatial mobility management is a feature that facilitates the seamless transit of the UAVs through their designated flight path. As used herein, geospatial mobility management is directed toward managing the mobility of the UAVs as they transit from one node to another subject to the specific geographic information about each data point through the flight path.

In general, for many known 5G networks, the entire flight pattern and the associated spatial authorizations are not always readily available to the users' UAVs. As a consequence, if the identity of the next node is not immediately available, a mobility registration update procedure is initiated, where the network provides the identity of the next node to the UAVs. However, the UAVs first need to quiz the network for the node identity information. Once the UAVs have the identification information, they are allowed to access the services of the next node. Notably, additional unexpected communications traffic is generated. In the event that such missing node identification information is sufficiently large throughout at least a portion of the network, other existing network connections and respective communications across that portion of the network may be disrupted. Such disruption is exacerbated through the high speed of the UAVs as they transit from node-to-node, and the mobility registration update process being frequently and repeatedly invoked. Additional service disruptions will also affect the UAVs in the event of latencies developing due to the inability of the UAVs from continuing on their flights at their expected speeds while waiting for the invocations of mobility registration procedure to succeed. Such disruptions will continue until the next node identification information is provided to the UAVs. The described service disruptions negatively impact the reliability and latency expectations of the 5G networks.

Accordingly, a system, medium, and method are provided for enhancing geospatial mobility management of unmanned aerial vehicles (UAVs). Specifically, as the UAVs transit from the present node to the next node a relatively high speeds, the well-timed transfers from the present node to the next node are enabled through the system, medium, and method as presented herein.

More specifically, the geospatial mobility management enhancements presented herein eliminate the execution of the mobility registration update procedure. As such, disruptions to the transit of the UAVs due to poorly executed handoffs are substantially reduced or eliminated to provide the seamless transit of the UAVs through their designated flight path. Such disruptions to the transit of the UAVs is at least partially characterized as the UAVs transiting the flight path without any interruption or delay that would at least temporarily idle the UAV transit at a single point along the transit path until the proper handoff can be executed to allow the UAV transit to continue. In addition, the elimination of instances of the mobility registration update procedure reduces additional communications traffic through the network. While the present application is primarily directed toward UAVs at or above the speeds defined above, the features of this disclosure may also be applied to other UEs, especially those UEs that may be subject to higher velocities, e.g., and without limitation, planes, helicopters, and high-speed rail trains.

Referring to FIG. 1, a block diagram is presented illustrating a computer system, i.e., a 5G network server system 100 (herein referred to as "the system 100") configured to execute operations directed toward enhancing geospatial mobility management of unmanned aerial vehicles (UAVs) 122, in accordance with some embodiments of the present disclosure. The system 100 includes one or more processing devices 104 (only one shown) communicatively and operably coupled to one or more memory devices 106 (only one shown) through a communications bus 102, and in some embodiments, through a memory bus (not shown). In some embodiments, the processing device 104 is a multicore processing device. The system 100 also includes a data storage system 108 that is communicatively coupled to the processing device 104 and memory device 106 through the communications bus 102. In at least some embodiments, the data storage system 108 provides storage to, and without limitation, a knowledge base 190 that includes at least a portion of the data 192 to enable operation of the system 100 as described further herein.

The system 100 further includes one or more input devices 110 and one or more output devices 112 communicatively coupled to the communications bus 102. In addition, the system 100 includes one or more Internet connections 114 (only one shown) communicatively coupled to the cloud 116 through the communications bus 102, and one or more network connections 118 (only one shown) communicatively coupled to one or more other computing devices 120 through the communications bus 102. In some embodiments, the Internet connections 114 facilitate communication between the system 100 and one or more cloud-based centralized systems and/or services (not shown in FIG. 1). In at least some embodiments, the system 100 is a portion of a cloud computing environment (see FIG. 8), e.g., and without limitation, the system 100 is a computer system/server that may be used as a portion of a cloud-based systems and communications environment through the cloud 116 and the Internet connections 114.

In at least some embodiments, the UAVs 122 are communicatively and operably coupled to a 5G network (not shown in FIG. 1) through a radio access network (RAN) 124, a user plane function (UPF) 126, the cloud 116, and the Internet connections 114. The RAN 124 performs various functions to enable efficient and reliable wireless communication between the UEs and the respective base stations, such as controlling the various communications layers and protocols including radio resource control (RRC), radio link control (RLC), medium access control (MAC) protocol, and physical layer (PHY). The UPF 126 is the function that does a significant portion of the work to connect the actual data coming over the RAN to the Internet through quickly and accurately routing the data packets to the correct destination. The RAN 124 and the UPF 126 are discussed further herein. In addition, in at least some embodiments, a UAV configuration console 128 is communicatively coupled to the UAVs and the 5G network through one or more additional Internet connections 130. The UAV configuration console 128 is employed for configuring the UAVs 122 such that the 5G network guides the UAVs from their sources to their respective destinations through a network slice that is at partially determined subject to the data input from the user at the UAV configuration console 128 (e.g., with respect to the mission of each UAV), in addition to the applications invoked, the transport features of the respective UAVs, and customer subscription requirements. Generally, the network slices are previously defined and are known artifacts subscribed to by the user, where the user selects the appropriate subscribed network slice through the UAV configuration console 128.

In one or more embodiments, a 5G network management tool 140 (herein referred to as "the tool 140") is at least partially resident within the memory device 106. In some embodiments, the tool 140 is fully resident within the memory device 106. The tool 140 is discussed in detail further in this disclosure. The tool 140 is configured to execute, with full or partial automation, tasks that include, without limitation, directing the transit of a plurality of UAVs from their source location to their respective destinations, as well as the execution of the directed operations, through the respective network slices. The tool 140 is further configured to leverage the low latency and reliable communication features and the faster data transfer features of the 5G network. In at least some embodiments, the tool 140 resident in the memory device 106 is configured to run continuously in the background to automatically execute the processes associated with the UAVs. In some embodiments, the tool 140 is directly engaged for specific tasking by the users thereof, e.g., and without limitation, manual execution commands. In some embodiments, the individual components of the tool 140 (as discussed further herein) are resident within a plurality of computing devices across the 5G network through, for example, and without limitation, the network connections 118 and the Internet connections 114.

In one or more embodiments, the tool 140 includes an operational support system (OSS) module 142. The OSS module 142 includes one or more programs that facilitate monitoring, control, analysis, and managing the 5G network for the respective communications service provider. In some embodiments, each individual program associated with the OSS is embedded within a respective module. The tool 140 also includes a basic service set (BSS) control module 144 that defines a network topology that facilitates providing a common medium via a single access point (AP) (not shown), where that AP is communicatively coupled to substantially all of the wireless devices within the respective network. In addition, the AP is operatively coupled to the same wireless devices to provide at least a portion of the management services thereof, including management of the wireless devices' access to the network subject to the respective criteria.

In at least some embodiments, the tool 140 includes a network/cloud automation/orchestration (NCAO) manager 146. The NCAO manager 146 is a cloud-based platform that includes artificial intelligence (AI) features to fully automate the operation of the respective 5G network. The NCAO manager 146 includes a geographical path planner (GPP) 148 that is configured to derive an allowed set of tracking area identifications (TAIs) (not shown in FIG. 1). A tracking area (TA) is a logical description of an area where a user can move around without updating the respective session management function (SMF) (described further herein with respect to FIG. 1). The TAI is the identification used to identify the respective tracking area and is constructed from the mobile country code (MCC), mobile network code (MNC) and tracking area code (TAC) (all described further with respect to FIG. 3). Accordingly, the TAI is a form of geospatial identification.

In some embodiments, the NCAO manager 146 also includes a data analytics function (DAF) 150 that is configured to collect data associated with the present status of the 5G network infrastructure including, without limitation, the present status of the network slices and the TAs on the determined paths, where such information is used to facilitate the low latency communications and high bandwidths. In addition, the DAF 150 consumes information from a network data analytics function (NWDAF) 164 (resident in a 5G control plane 156) and the resource requirements for the users' UAVs 122 to determine whether the service can use an existing network slice or the network needs to instantiate a new network slice to accommodate the request per the user requirements. The NWDAF 164 and the 5G control plane 156 are discussed further herein.

Additionally, in some embodiments, the NCAO manager 146 includes a resource manager 152 that facilitates locating the geo-coordinates of relevant objects (e.g., macro cells and small cells) associated with the network slice and the transit of the UAVs spatially, where the status of such relevant objects is obtained through the DAF 150. Therefore, the resource manager 152 facilitates instantiating each network slice, i.e., allocating the necessary network resources for each instance of network slices. Accordingly, the NCAO manager 146, through the coordinated operation of the GPP 148, the DAF 150, and the resource manager 152, determines the optimal flight paths of the UAVs 122 as one or more TAIs and the network resources associated with a subscribed network slice that is to be used to execute the flight plan as determined by the user through the UAV configuration console 128.

In one or more embodiments, the tool 140 includes a UAV management tool 154 that is configured to control each UAV such that the UAVs adhere to the programmed flight paths within the parameters established by the NCAO manager 146. Such control includes, without limitation, altitude, course, air velocity, and pitch.

In at least some embodiments, the tool 140 includes a 5G control plane 156. In general, in network routing, the control plane (not shown in FIG. 1) is the part of the network architecture that is concerned with the communications between the UEs (UAVs) and the network, including the data routing paths. The 5G control plane 156 facilitates intra-coordination of the features resident therein and inter-coordination with the remainder of the network. In some embodiments, the 5G control plane 156 facilitates drawing (virtually) the network topology, including placing network-related information into a routing table (not shown) that defines the process for managing incoming packets. In many instances, the routing table contains a list of destination addresses and the outgoing interfaces associated with each. In addition, the logic associated with the 5G control plane 156 identifies certain packets to be discarded, as well as preferential treatment of certain packets for which a high quality of service is defined by such mechanisms as differentiated services.

In some embodiments, the 5G control plane 156 includes a network exposure function (NEF) 158 that abstracts the capabilities of the network thereby creating a programmable environment. Also, in some embodiments, the 5G control plane 156 includes a unified data repository (UDR) 160 that is discussed further with respect to FIG. 4. Further, in some embodiments, the 5G control plane 156 includes a unified data management (UDM) 162 that is configured to generate authentication credentials used during the authentication process for each UE for each mission. In addition, the UDM 162 authorizes network access and roaming based on user subscriptions and is responsible for subscription management and privacy protection.

In one or more embodiments, the 5G control plane 156 includes a network data analytics function (NWDAF) 164 that is configured to extract and analyze data from the network to optimize performance, reduce security risks, and improve the subscriber's quality of experience. In contrast to the DAF 150 in the NCAO manager 146, the NWDAF 164 is specific to the respective network's infrastructure. Specifically, if the user's subscribed service doesn't exist on the geographical path, then the GPP 148 will request the resource manager 152 to deploy or update the respective network slice based on an input from the DAF 150 for the possible paths.

In some embodiments, the 5G control plane 156 includes a network slice selection function (NSSF) (not shown) that is configured to select the network slicing instance (NSI) (i.e., instantiate the respective network slice), determine the allowed network slice selection assistance information (NSSAI) (not shown), and set an access and mobility management function (AMF) 168 (discussed further) to serve the UE. The AMF 168 is configured to allocate a set of tracking areas in a list of TAIs to each respective UE as it registers with the network, where the list of TAIs includes allowed areas and non-allowed areas. In addition, during registration of the respective UEs, if any service area restrictions of the UE are not present with the AMF 168, the AMF 168 is configured to fetch the service area restrictions of the UE from the UDM 162.

In at least some embodiments, the 5G control plane 156 includes a session management function (SMF) 170 that is configured to interact with a decoupled data plane (not shown) for creating, updating and removing packet data unit (PDU) sessions, and managing session context with a user plane function (UPF) (not shown). In some embodiments, the 5G control plane 156 includes a policy control function (PCF) 172 that is configured to provide policy rules for the other control plane functions, including, without limitation, network slicing, roaming and mobility management.

In some embodiments, the data storage system 108 is configured to maintain a knowledge base 190 that includes any data 192 the tool 140 needs for proper 5G network execution. The data storage system 108 is also configured to store the data 192 collected during the various UAV operations.

Figure 2:
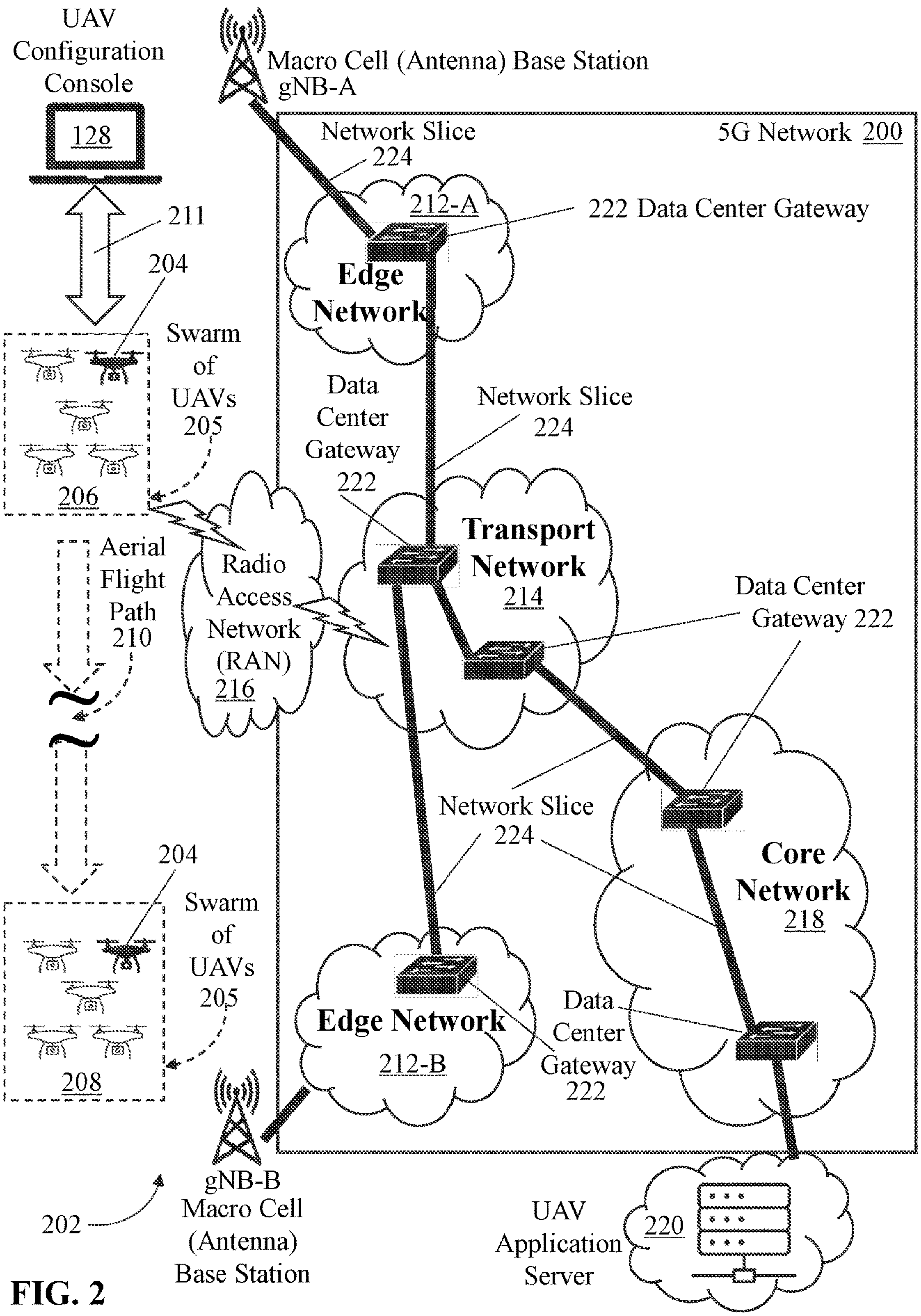
FIG. 2 is a block schematic diagram illustrating a portion of a 5G network and a relationship between a plurality of UAVs and the portion of the 5G network, in accordance with some embodiments of the present disclosure.

Referring to FIG. 2, a block schematic diagram illustrating a portion of a 5G network 200 and a relationship 202 between a plurality of UAVs 204 and the 5G network 200, in accordance with some embodiments of the present disclosure. In some embodiments, the plurality of UAVs 204 is referred to as the swarm of UAVs 205. The UAV configuration console 128 (see FIG. 1) is communicatively and operably coupled to each UAV 204 of the swarm of UAVs 205, where the UAV configuration console 128 is used by the operator to configure the swarm of UAVs 205 for transiting from one or more geospatial starting regions 206 (only one shown) to one or more geospatial terminal regions 208 (only one shown) through one or more aerial flight paths 210 (only one shown). Accordingly, the UAV console 128 and each UAV 204 of the swarm of UAVs 205 transmit and receive two-way communications 211 therebetween.

In some embodiments, as illustrated in FIG. 2, five drones are included in the swarm of UAVs 205, where four of the UAVs 204 are not colored-in, and one UAV 204 (the only UAV labeled) is colored-in, indicating that at least one of the UAVs 204 is a different make and/or model from that of the other four UAVs 204. The number of UAVs 204 and the types of UAVs 204 are non-limiting factors and the tool 140 (see FIG. 1) is configured to simultaneously execute the communications functions for any number of UEs of any type, including each and every UAV 204, regardless of where they are presently physically located within the 5G network 200 and where they are destined.

In some embodiments, and as illustrated in FIG. 2, the 5G network 200 includes one or more gNBs, where the two gNBs of gNB-A and gNB-B are non-limiting. As previously described, gNB-A and gNB-B are macro cells in the form of large antenna towers that act as macro base stations. The 5G network 200 includes three distinct, but closely related, portions. The edge portion includes those resources that facilitate communications and computing operations as close to the respective entities as practical to support the processes thereof. As such, FIG. 2 shows two edge networks 212-A and 212-B (collectively, the edge networks 212), where edge network 212-A is communicatively and operably coupled to the gNB-A macro base station, and edge network 212-B is communicatively and operably coupled to the gNB-B macro base station. The value of two edge sections is non-limiting.

In one or more embodiments, the 5G network 200 also includes a transport network 214 that is communicatively and operably coupled to the edge networks 212-A and 212-B. The transport network 214 is also communicatively and operably coupled to the swarm of UAVs 205 through a radio access network (RAN) 216. The 5G network 200 further includes a core network 218 that is operably coupled to the RAN 216 through the transport network 214.

The transport network 214 is configured to provide a plurality of services. One such service is ultra-reliable low-latency communication (URLLC) that is configured for special application scenarios that include, without limitation, Internet of Vehicles (IoV), industrial controls, smart manufacturing, remote surgery, and operational UAV management. Another such service is enhanced mobile broadband (eMBB) that is configured to enhance mobile Internet application scenarios and communication experiences between people through extremely high data rate communications. Typical applications include, without limitation, high definition (HD) video, virtual reality (VR), cloud access, high-speed mobile Internet access, artificial intelligence (AI)-based application, and operational UAV management. In addition, a service provided through the transport network 214 is massive machine-type communications (mMTC) that is configured for Internet of Things (IoT) device interconnection scenarios with an extremely high connection density of online devices. Typical applications include environment monitoring, smart meter reading, and smart agriculture.

The radio access network (RAN) 216 is configured to provide the wireless connectivity to the UEs, including the swarm of UAVs 205 affiliated with the 5G network 200. In some embodiments, the UEs (including the swarm of UAVs 205), the gNB-A, and the gNB-B are included within the RAN 216.

The RAN 216 is tiered, i.e., it is divided into three frequency bands of low-band, mid-band, and high-band, where each of the three bands represents a tier, and each tiered band has distinguishing features and capabilities. The low-band (approximately 600 megahertz (MHz) to approximately 700 MHz) has greater coverage than the other two tiers, but lower speeds. More specifically, in some embodiments, the low-band coverage includes up to hundreds of square miles with 5G service that ranges in speed from approximately 30 megabits per second (Mbps) to approximately 250 Mbps. The mid-band (approximately 1.7 gigahertz (GHz) to approximately 3.5 GHZ) covers a several-mile radius with 5G service that ranges from approximately 100 Mbps to approximately 900 Mbps. The high-band (approximately 24 GHz to approximately 40 GHz), offers higher speeds, but a smaller coverage radius. More specifically, in some embodiments, the high-band coverage includes approximately a one-mile or lower radius while delivering approximately 1 Gbps to approximately 3 Gbps. In some embodiments, the 5G network 200 uses additional frequencies across all three of the tiered bands to further enhance and optimize performance, including using multiple frequencies simultaneously.

The core network 218 includes resources not available in the edge networks 212, the transport network 214, or the RAN 216, where such resources facilitate coordination between different parts of the 5G network 200 and also facilitates connectivity to the Internet. More specifically, for example, and without limitation, the core network 218 facilitates connectivity and mobility management, authentication and authorization, and subscriber data management and policy management. In general, the functionality of the core network 218 is substantially software-based and designed as cloud-native, thereby facilitating higher deployment agility and flexibility on multiple cloud infrastructures.

In some embodiments, a cloud-based UAV application server 220 is communicatively and operably couped to the core network 218 to facilitate communications with the swarm of UAVs 205. In some embodiments, the UAV application server 220 is a portion of the RAN 216. Additionally, each of the edge networks 212, the transport network 214, and the core network 218 include one or more data center gateways 222. In addition, the 5G network 200 includes a plurality of small cell base stations (not shown) to facilitate the wireless coverage of the UAVs 204 by the 5G network 200.

In at least some embodiments, at least a portion of the components of the 5G network 200 are communicatively and operably coupled through a network slice 224 (shown as the heavily bolded lines in FIG. 2) to facilitate the transit of the swarm of UAVs 205 from the one or more geospatial starting regions 206 to the one or more geospatial terminal regions 208 through the one or more aerial flight paths 210. In general, a network slice 224 is a logical (virtual) network customized to serve a defined business purpose or customer, consisting of an end-to-end composition of all the varied network resources required to satisfy the specific performance and economic needs of that particular service class or customer application. As such, the network slice 224 uses dedicated network resources for a particular service for particular service users that are isolated from any of the remaining network resources utilized by the other non-service users. During a high network load situation, service users will typically not have their network resources associated with the network slice 224 blocked due to the activities caused by non-service users. Therefore, network slicing provides the ability to support these service users by creating a tailored virtual slice of the 5G network 200 from end to end, that facilitates lessening any network congestion occurrences and enhancing the overall service experiences for the service users. In addition, multiple network slices (virtualized and independent) are created on top of the common physical infrastructure of the 5G network 200, thereby facilitating network multiplexing. In some embodiments, the allocation of the network slice 224 includes, substantially, the URRLC and eMBB services. In some embodiments, the mMTC service will also be allocated. Accordingly, the network slice 224 illustrates the extent of the virtual network assigned to the swarm of UAVs 204. In some embodiments, the network slices 224 are instantiated during registration of the respective UAVs 204, where the network resources are defined through the UAV configuration console 128.

With respect to FIG. 2, while some of the physical attributes of the flight of the swarm of UAVs 205 are shown next to the virtual expanse of the 5G network 200, other than the RAN 216, and the macro base stations gNB-A and gNB-B with their physical proximity to the respective edge networks 212-A and 212-B, there is no other direct physical relationship.

Figure 3:
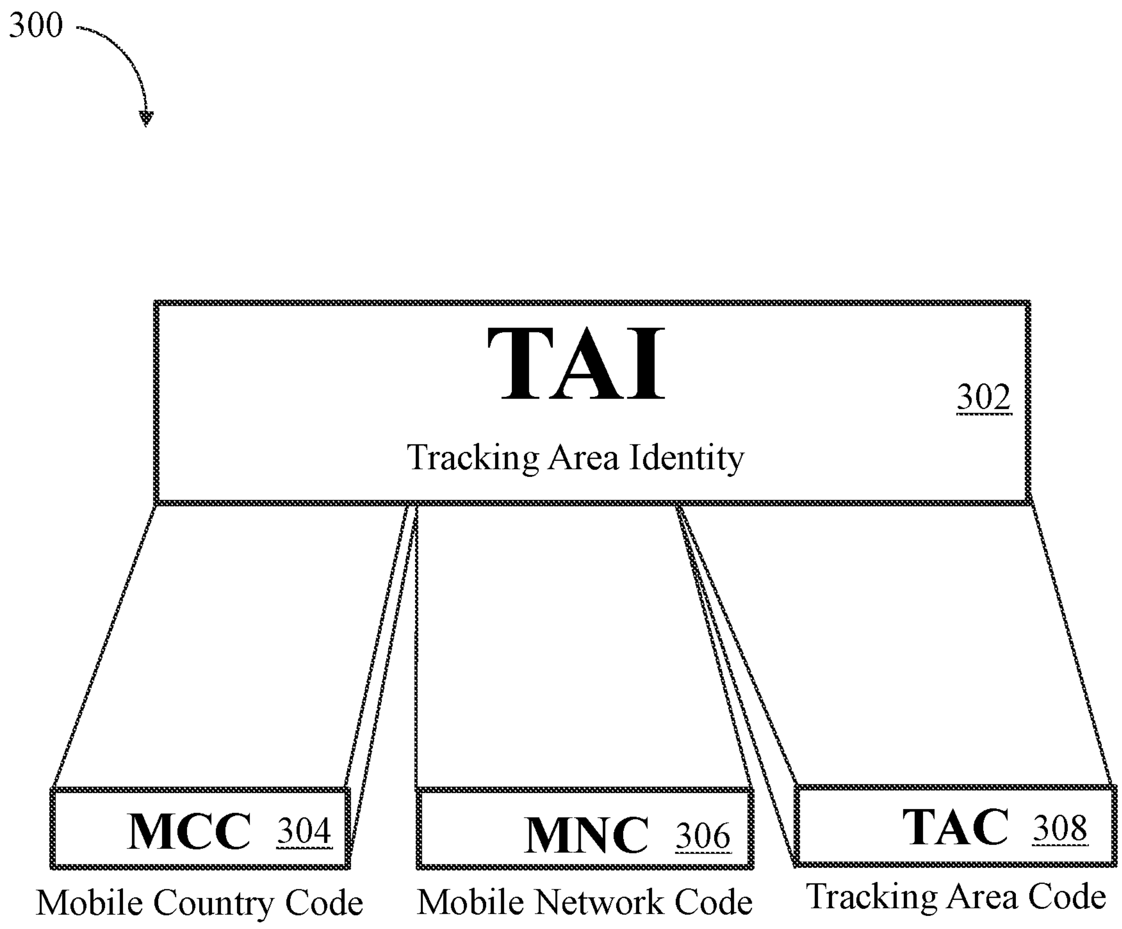
FIG. 3 is a schematic block diagram illustrating a relationship between user equipment (UE) registration and tracking area identification (TAI) in the 5G network of FIG. 2, in accordance with some embodiments of the present disclosure.

Referring to FIG. 3, a schematic block diagram is presented illustrating a relationship 300 between user equipment (UE) registration and tracking area identification (TAI) in the 5G network 200 of FIG. 2, in accordance with some embodiments of the present disclosure. In general, a tracking area (TA) is a logical concept of a physical geographical area where a user can move without performing a mobility registration update procedure (described further herein). In some embodiments, the tracking area may be extended to a tracking volume, for example, in the case of UAVs. The 5G network allocates a list with one or more TAs to the user. In certain operation modes, the UE may move freely in all TAs of the list without performing the mobility registration update procedure. The tracking area identification (TAI) 302 is used to identify tracking areas, and these TAIs 302 are associated with the list of TAs. The TAI 302 is constructed from the mobile country code (MCC) 304, mobile network code (MNC) 306, and tracking area code (TAC) 308. The MCC 304 is a code used in wireless telephone networks uniquely identifying the home country of user. In order to uniquely identify a mobile subscriber's network, the MCC 304 is combined with the MNC 306. The MNC 306 is a number used to uniquely identify a given network from within a specified country. The TAC 308 identifies a TA within a particular network. Accordingly, the TAI 302 includes the MCC 304, the MNC 306, and the TAC 308.

In many embodiments, and referring to FIG. 2 as well, the set of TAIs 302 to be used during a transit of the swarm of UAVs 205 is resident within the tool 140. The TAIs 302 are generated through the GPP 148 and stored in the UDR 160 (both as discussed further herein). A complete set of TAIs 302 for the transit through the aerial flight path 210 facilitates a seamless transit. When a UE, i.e., each UAV 204 of the swarm of UAVs 205, is registered with the 5G network 200 by the user, a set of TAs in the list of TAIs 302 is allocated to each UAV 204 of the swarm of UAVs 205, where the set of TAs includes the authorized areas, and in some embodiments, also includes any restricted areas. Once a particular UAV 204 is registered with the 5G network 200, the UAV 204 is authorized to receive the services provided by the network slice 224. The type of registration indicates if the UAV performs an initial registration, a mobility registration update, or a periodic registration update. Each of the gNB-A and gNB-B broadcasts the respective unique TAC 308 to indicate to which TA the respective gNB belongs.

In some known 5G networks, a particular UE, i.e., a particular UAV 204 of the swarm of UAVs 205 may not be authorized for a particular TA that the UAV 204 requires for the transit. In some embodiments, the TA is provided by the 5G network 200. However, the TAI associated with the respective TA may not be in the list of TAIs 302 associated with the present mobility registration that has been received by the respective UAV 204. Therefore, the present mobility registration of the UAV 204 will not support transit into a TA that does not have the respective TAI, and communications between the UAV 204 and the 5G network 200 will not be supported for that TA to maintain the mobility registration for the transit. Therefore, execution of the mobility registration update procedure will be necessary for the respective TAI 302 to be added to the list of TAIs 302 for the registration of this particular UAV 204. The mobility registration update procedure initiates a registration update process for the affected UAVs 204 due to one or more of the previously described mobility issues, to update the capabilities or protocol parameters for the affected UAVs 204, to request a change of the set of network slices 224 the affected UAVs 204 are allowed to use. Each halting of a UAV 204 in transit until the registration update is completed tends to defeat the goals of the 5G network 200 to increase reliability and availability, and decrease latencies.

In addition, is some known networks, frequent instances of the execution of the mobility registration update Accordingly, procedure can add overhead for the transiting UAVs 204. For example, and without limitation, a packet data unit (PDU) session will be established to facilitate the update to the affected UAVs' 204 mobility registration to add the TAI 302. The PDU session establishment includes the process of establishing a logical connection and a data path between the affected UAVs 204 and the core network 218 to support the data packet transfer for the mobility registration update. As such, the affected UAV 204 initiates the PDU session establishment process by transmitting a request to the core network 218. The request includes information about the type of service that the UAV 204 wants to use, and the type of traffic (data, audio, video, etc.). Once the PDU session has been established, the UAV 204 will use it to send and receive data associated with adding the TAI 302 to the list of TAIs. The core network 218 manages the resources used by the PDU session to ensure that the 5G network is used efficiently and that the UAV 204 receives the appropriate quality of service (QOS). The establishment, and disestablishment, of the PDU session results in a negative impact to the ultra-reliable low-latency communication (URLLC) services of the 5G network 200 by increasing communications traffic and possibly interrupting other communications traffic.

Figure 4:
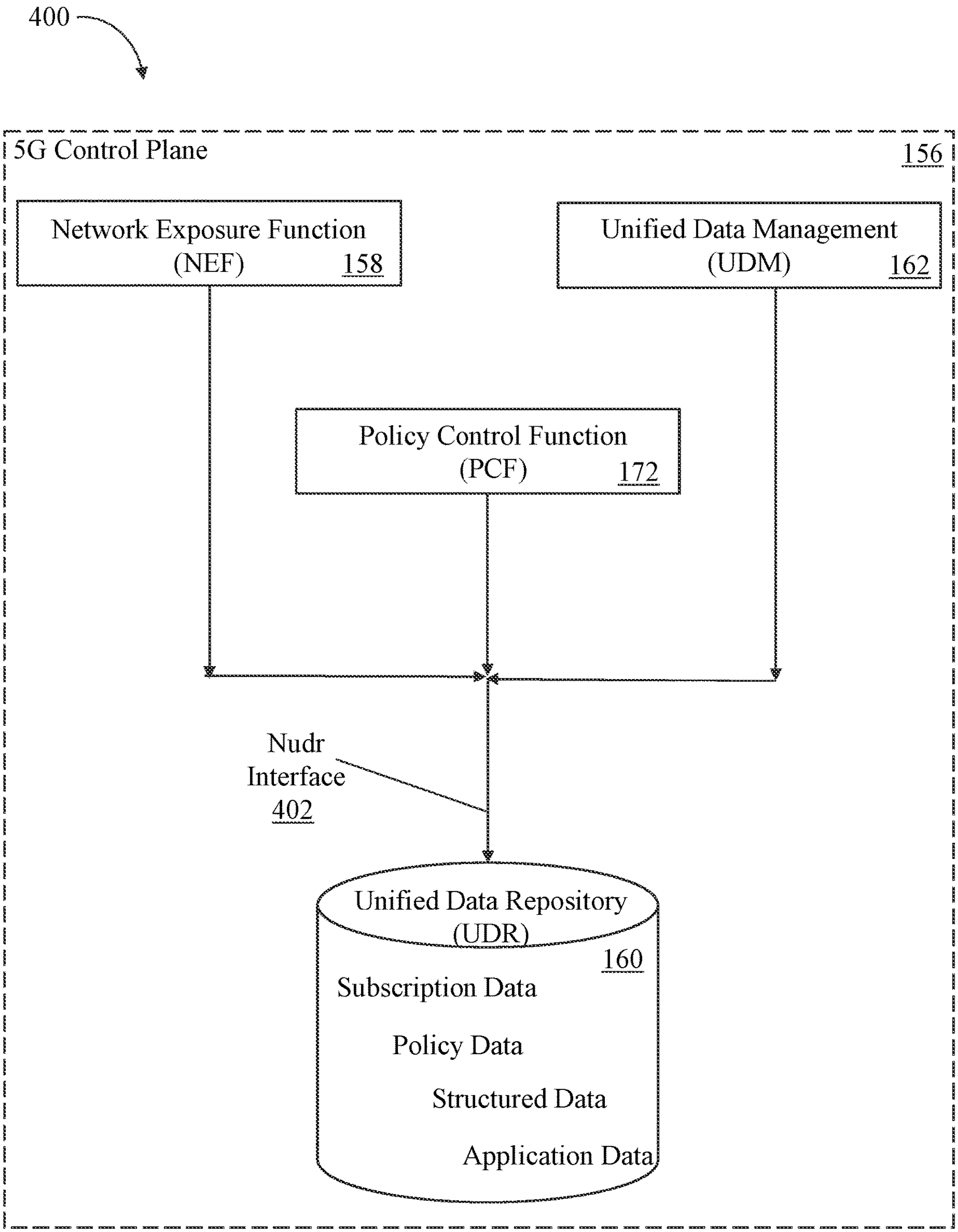
FIG. 4 is a schematic block diagram illustrating a unified data repository (UDR), in accordance with some embodiments of the present disclosure.

Referring to FIG. 4, a schematic block diagram illustrating the unified data repository (UDR) 160, in accordance with some embodiments of the present disclosure. More specifically, FIG. 4 shows a relationship 400 between the UDR 160 and other artifacts within the 5G control plane 156. The UDR 160 is a centralized data storage unit that consolidates data collected from various, often siloed data sources associated with the 5G network 200. The UDR 160 facilitates substantially seamless data availability on an organization-wide basis to all resources (human, machine, and application) via a single hub. The result of implementing the UDR 160 is a high-level and unified view of enterprise data, more accurate insights derived from multiple data points as opposed to limited data, better data management, and governance, and unification of otherwise possibly disparate business segments. In some embodiments, the UDR 160 facilitates more rapid data storage, updating, and retrieval operations than the data storage system 108 (see FIG. 1).

As described with respect to FIG. 1, the UDR 160 is resident within the control plane 156. The NEF 158, the UDM 162, and the PCF 172 are also resident within the control plane 156. The control plane 156 is discussed further with respect to FIG. 5. As previously described, in some embodiments, the NEF (network exposure function) 158 abstracts the capabilities of the network, thereby creating a programmable environment. Such an environment facilitates creating new service logic that introduces new software artifacts, e.g., and without limitation, application programming interfaces (APIs) tailormade for the respective operational needs in addition to existing APIs.

Further, the UDM (unified data management) 162 is configured to generate authentication credentials used during the authentication process for each UE, e.g., UAV 204 (see FIG. 2), for each mission. In addition, the UDM 162 authorizes network access and roaming based on user subscriptions and is responsible for subscription management and privacy protection. Moreover, the PCF (policy control function) 172 is configured to provide policy rules for other control plane functions, including, without limitation, network slicing as previously described, roaming, and mobility management as previously described.

In at least some embodiments, the NEF 158, UDM 162, and the PCF 172 are communicatively coupled to the UDR 160 through a Nudr interface 402. The Nudr interface 402 is defined for the NEF 158, UDM 162, and the PCF 172 network functions to access a particular set of the data stored and to read, update (including add, modify), delete, and subscribe to notification of relevant data changes in the UDR 160. Data resident within the UDR 160 includes, without limitation, subscription data, policy data, structured data, and application data. In some embodiments, subscription data for each UAV 204 (see FIG. 2) in the UDR 160 also includes a service area restriction which may contain the authorized areas and also any restricted areas as specified by using explicit TAIs (as previously described) and/or other geographical information, e.g., and without limitation, longitude/latitude, zip code, etc. The geographical information used to specify authorized and restricted areas is only managed in the 5G network 200, and the 5G network 200 will map it to the list of TAIs 302 before sending the service area restriction information to the PCF 172 and the UAV 204 through the RAN 216.

Figure 5:
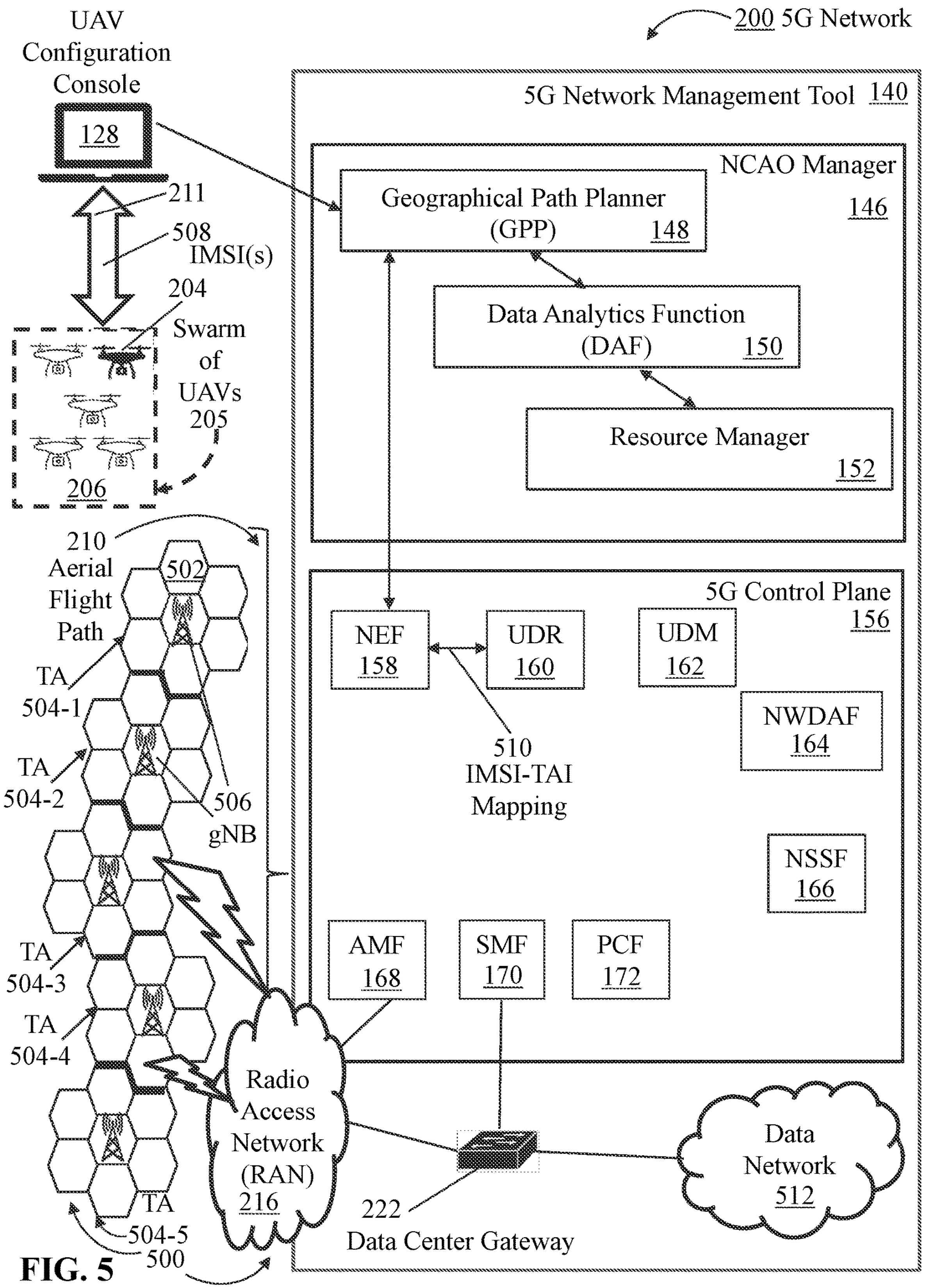
FIG. 5 is a block schematic diagram illustrating a relationship between the plurality of UAVs and a portion of the 5G network management tool of FIG. 1, in accordance with some embodiments of the present disclosure.

Referring to FIG. 5, a block schematic diagram is presented illustrating a relationship 500 between the swarm of UAVs 205 of FIG. 2 and a portion of the 5G network management tool 140 of FIG. 1, in accordance with some embodiments of the present disclosure. As described for FIG. 2, the swarm of UAVs 205 transits through the aerial flight path 210 that is now depicted as a series of interconnected hexagonal units 502 (only one labeled for clarity). Each hexagon unit 502 is arranged to define a TA 504 with seven other units 502, where each TA 504 is defined with a honeycomb structure. As shown, the aerial flight path 210 includes five TAs 504 (as defined collectively), i.e., a first TA 504-1, a second TA 504-2, a third TA 504-3, a fourth TA 504-4, and a fifth TA 504-5, where the adjoining cell interfaces between the interconnected TAs 504 are bolded for clarity, and where the TAs 504 that define the aerial flight path 210 are encompassed by a bracket. The extent of the aerial flight path 210 being five TAs 504 is non-limiting. All five TAs 504 are communicatively coupled to the 5G network 200 through the RAN 216. Each TA 504 includes a gNB 506, i.e., a macro cell in the form of a large antenna tower that acts as a macro base station (only two labeled in FIG. 5). Each TA 504 also includes any number and distribution of small cell base stations (not shown) that enables operation of the swarm of UAVs 205 through the 5G network 200 as described herein. In at least some embodiments, the macro and small cell base stations, as well as each of the UAVs 204, are included in the RAN 216 for two-way communications with the 5G control plane 156.

In at least some embodiments, as described for FIG. 1, the tool 140 includes the network/cloud automation/orchestration (NCAO) manager 146. The NCAO manager 146 is a cloud-based platform that includes artificial intelligence (AI) features to fully automate the operation of the respective 5G network 200. The NCAO manager 146 includes a geographical path planner (GPP) 148 that is configured to derive the allowed set of tracking area identification (TAIs) 302 as discussed with respect to FIG. 3. Each of the TAs 504 includes a unique TAI 302. In addition to being communicatively and operably coupled to each UAV 204, the UAV configuration console 128 is communicatively and operably coupled to the GPP 148. Therefore, in addition to configuring the swarm of UAVs 205 for their transit through the aerial flight path 210, the UAV configuration console 128 transmits the details of the network slice 224 (see FIG. 2) as provided by the respective subscriber to the 5G network 200 to the GPP 148. Such information includes, without limitation, the sources and destinations of the swarm of UAVs 205.

In some embodiments, each UAV 204 in the swarm of UAVs 205 is associated with a numeric identifier (or designator), i.e., an international mobile subscriber identity (IMSI) 508 that is used to uniquely identify at least a portion of a subscription for the respective network slice 224. In some embodiments, the subscriber IMSI is extended to also identify each respective UE asset, including each UAV 204, with a unique IMSI 508. The IMSI 508 is used when updating the subscriber's location in the 5G network 200 to manage roaming and handovers, ensuring that the communications are routed to the user as the UAVs 204 transit geographically. As shown in FIG. 5, the two-way communications 211 between the UAV configuration console 128 and each UAV 204 of the swarm of UAVs 205 includes the respective IMSIs 508. Each IMSI 508 is previously derived and assigned prior to the registration of the respective UAVs 204 through the UAV configuration console 128. The ISMIs 508 are derived through the MCC 304 and MNC 306 (as discussed with respect to FIG. 3) as well as a mobile subscriber identity (MSIN) that is a unique number for each subscriber within a particular network.

As such, in some embodiments, differing UE assets with divergent operational goals are separately tiered, where the three frequency tiers are previously described. For example, and without limitation, in some embodiments, various UAVs 204 with divergent missions are encoded for different tier lists, where such tier lists indicate which UEs for which subscribers are authorized for each frequency tier. In addition, is some embodiments, each UAV 204 of the swarm of UAVs 205 is assigned divergent flight paths to get to the same destination, and the unique IMSIs facilitate such divergent operations through the 5G network 200. The IMSIs are further transmitted to the GPP 148. The transmission of the details of the network slice 224 are facilitated by the operational support system (OSS) module 142 and the basic service set (BSS) control module 144 (both shown and described with respect to FIG. 1).

In at least some embodiments, the GPP 148 is configured to derive the allowed set of TAIs 302 that will facilitate the UAVs 204 receiving optimal service from the 5G network 200 for the subscribed network slice 224 based on information received from data analytics function (DAF) 150 and the resource manager 152. As described with respect to FIG. 1, the DAF 150 is configured to collect data associated with the present status of the infrastructure of the 5G network 200 including, without limitation, the present status of the network slices 224 and the TAs 504 on the determined aerial flight path 210, where such information is used to facilitate the low latency communications and high bandwidths. The resource manager 152 facilitates locating the geo-coordinates of relevant objects (e.g., macro cells (e.g., gNB 506) and small cells) associated with the network slice 224 and the transit of the swarm of UAVs 205 spatially, where the status of such relevant objects is obtained through the DAF 150 as previously described. Therefore, the resource manager 152 facilitates instantiating each network slice 224, i.e., allocating the necessary network resources for each instance of network slices. Furthermore, the NCAO manager 146, through the coordinated operation of the GPP 148, the DAF 150, and the resource manager 152, determines the optimal flight paths of the UAVs 204. The optimal flight paths are determined as one or more TAIs 302 and the network resources of the subscribed network slice 224 that are to be used to execute the flight plan as determined by the user through the UAV configuration console 128. Accordingly, a data mapping of the list of IMSIs and the list of TAIs 302 for the respective subscription is generated, thereby defining an IMSI-TAI mapping 510.

In one or more embodiments, the 5G control plane 156 includes the network exposure function (NEF) 158 that abstracts the capabilities of the network thereby creating a programmable environment. More specifically, the GPP 148 transmits the IMSI-TAI data mapping 510 between the IMSIs 508 and TAIs 302 to the NEF 158. Such IMSI-TAI mapping 510 may be represented as "IMSI-1: <TAI-a, TAI-b, TAI-c, TAI-d, TAI-e>," "IMSI-2: <TAI-a, TAI-b, TAI-c, TAI-d, TAI-e>," . . . "IMSI-n: <TAI-a, TAI-b, TAI-c, TAI-d, TAI-e>," where each IMSI 508 indicates a particular subscriber and for the example of five UAVs 204 as presented herein n=5. In addition, TAI-a represents the TAI 302 for the first TA 504-1, TAI-b represents the TAI 302 for the second TA 504-2, TAI-c represents the TAI 302 for the third TA 504-3, TAI-d represents the TAI 302 for the fourth TA 504-4, and TAI-e represents the TAI 302 for the fifth TA 504-5. The IMSI-TAI mapping 510 is transmitted from the NEF 158 to the UDR 160 for storage and retrieval.

Moreover, in some embodiments, the access and mobility management function (AMF) 168 is configured to serve the UAVs 204, where the AMF 168 is communicatively coupled to the swarm of UAVs 205 through the RAN 216. The AMF 168 receives the connection-related information and the session related information from each UAV 204 and manages connection and mobility management tasks. More specifically, the AMF 168 is configured to allocate the set of TAs 504 per the list of TAIs 302 to each respective UAV 204 as it registers with the 5G network 200, where the list of TAIs 302 includes authorized areas and restricted areas. In some embodiments, the restricted areas are a subset of the full list of TAIs 302 stored as subscriber data in the UDR 160. In some embodiments, the restricted areas are presented to the UAV 204 during the registration procedure. In addition, during registration of the respective UAVs 204, if any service area restrictions of the UAVs 204 are not present with the AMF 168, the AMF 168 is configured to fetch the service area restrictions of the UAVs 204 from the unified data management (UDM) 162. As previously described, the UDM 162 is configured to generate authentication credentials used during the authentication process for each UAV 204 for each mission. In addition, the UDM 162 authorizes network access and roaming for the UAVs 204 based on user subscriptions and is responsible for subscription management and privacy protection.

In some embodiments, the AMF 168 determines and updates a mobility pattern of the UAV 204 based on one or more of the subscription of the UAV 204, statistics of the UAV 204 mobility, network local policy, and the UAV 204 assisted information. Such assisted information for the UAV 204 is requested during the registration process. Specifically, the user through the UAV 204 requests a particular network slice by including the appropriate single-network slice selection assistance information (S-NSSAI) in the registration request message, that is then processed by the AMF 168 to provide access to the requested network slice, given that the UAV 204 has the necessary authorizations. The S-NSSAI is used to uniquely identify a network slice. The mobility pattern is used by the AMF 168 to optimize mobility support provided to the UAV 204, for example, registration area allocation. In some embodiments, the statistics of the UAV 204 mobility can be historical or expected UAV 204 moving trajectories. If the NWDAF 164 is deployed, the statistics of the UAV 204 mobility is also provided as a result of the respective analytical results, i.e., statistics or predictions, provided by the NWDAF 164.

Further, in at least some embodiments, the session management function (SMF) 170 is configured to create, update, and remove packet data unit (PDU) sessions. As such, the SMF 170 is communicatively coupled to a data center gateway 222 that communicatively couples the 5G control plane 156, a data network 512, and the RAN 216 for access to the swarm of UAVs 205. In some embodiments, in the context of 5G networks, a "data network" refers to the concept of a "data network name" (DNN). A DNN is a logical network identifier used in the 5G core network 218 to route user data within operator services and towards external services.

In operation, in some embodiments, as each UAV 204 of the swarm of UAVs 205 is registered, for example, through the UAV configuration console 128, the AMF 168 allocates the set of TAs 504 from the list of TAIs 302 to each respective UAV 204, where the list of TAIs 302 includes authorized and restricted areas. In addition, during registration of the respective UAVs 204, if any service area restrictions of the UAV 204 are not present with the AMF 168, the AMF 168 is configured to fetch the service area restrictions of the UAV 204 from the UDM 162. The list of TAIs 302 is established through the GPP 148 deriving the allowed set of TAIs 302. These TAIs 302 facilitate the UAVs 204 receiving optimal service from the 5G network 200 for the subscribed network slice 224. The TAIs 302 generated through the GPP 148 are stored in the UDR 160. Accordingly, the NCAO manager 146 and the 5G control plane 156 cooperate to guide the swarm of UAVs 205 through the aerial flight path 210 using the subscribed network slice 224, where the subscribers plan is determined and articulated by the user through the UAV configuration console 128.

Such optimal service, in at least some embodiments, presents service-related goals for the registered subscribers that are used to facilitate the best-fits of the TAIs 302 and the respective TAs 504. More specifically, such optimal aerial flight paths 210 are at least partially subject to information received from the data analytics function (DAF) 150. As previously described, the DAF 150 is configured to collect data associated with the present status of the infrastructure of the 5G network 200 including, without limitation, the present status of the network slices 224 and the TAs 504 on the determined paths. Such information is used to facilitate the low latency communications and high bandwidths that at least partially characterize the optimal service. In addition, the optimal service is subject to the resource manager 152 that facilitates locating the geo-coordinates of relevant objects (e.g., macro cells and small cells) associated with the respective network slice 224 and the transit of the UAVs 204 spatially, where the status of such relevant objects is obtained through the DAF 150 as previously described. Therefore, the resource manager 152 facilitates instantiating each network slice, i.e., the GPP 148, the DAF 150, and the resource manager 152 cooperate to determine the optimal aerial flight paths 210 of the UAVs 204 through the TAs 504 with the respective TAIs 302 and with the necessary network resources for each instance of network slices.

In addition, in operation, the subscriber to the particular network slice 224 submits the source, i.e., the geospatial starting regions 206 and the destination, i.e., the geospatial terminal region 208 of each UAV 204 of the swarm of UAVs 205 to the NCAO manager 146 through the UAV configuration console 128. Moreover, the subscriber provides the NCAO manager 146 with the IMSI 508 of each of the UAVs 204. As previously described, the IMSI 508 is used to uniquely identify the subscriber in the 5G network 200, as well as each of the UAVs 204.

Therefore, at the time of registration of the UAVs 204, each IMSI 508 for each respective UAV 204 is derived and appropriately assigned, and the respective TAs 504 are allocated from the list of TAIs 302. Furthermore, in operation, an IMSI-TAI data mapping 510 of the list of IMSIs 508 and the list of TAIs 302 for the respective subscription is generated. More specifically, the GPP 148 transmits the IMSI-TAI data mapping 510 between the IMSIs 508 and TAIs 302 to the NEF (network exposure function) 158 that creates the new service logic through introducing the IMSI-TAI mapping 510 as a new software artifact. The IMSI-TAI mapping 510 is transmitted from the NEF 158 to the UDR 160 for storage and retrieval. Accordingly, in operation, each particular UE, i.e., each particular UAV 204 of the swarm of UAVs 205 transits freely in all of the authorized TAs 504 associated with the data mapping 510 between the IMSIs 508 and TAIs 302.

Figure 6:
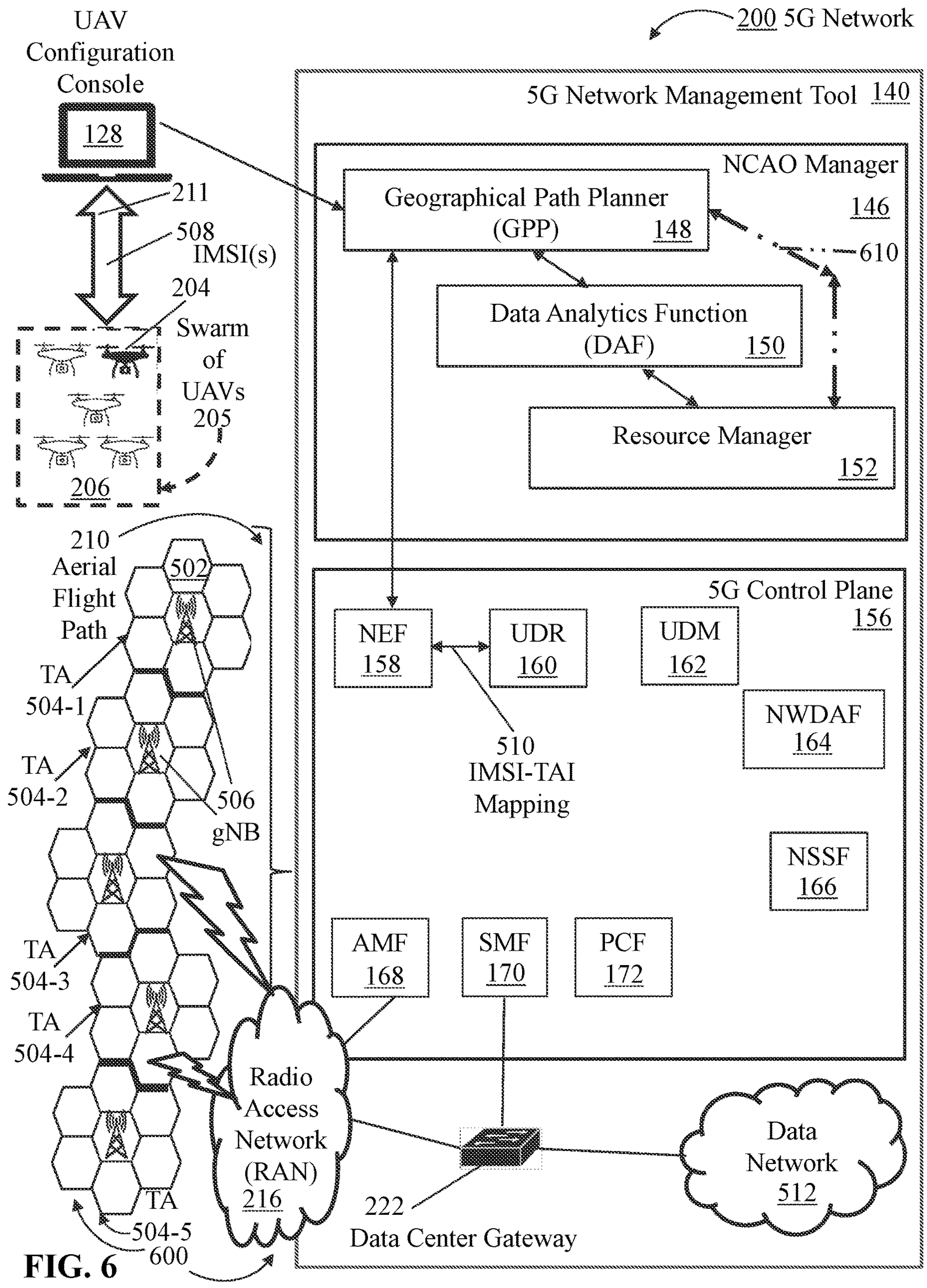
FIG. 6 is a block schematic diagram illustrating a relationship between the plurality of UAVs and a portion of the 5G network management tool of FIG. 1, in accordance with some embodiments of the present disclosure.

Referring to FIG. 6, a block schematic diagram is presented illustrating a relationship 600 between the swarm of UAVs 205 of FIG. 2 and a portion of the 5G network management tool 140 of FIG. 1, in accordance with some embodiments of the present disclosure. The structure of the relationship 600 shown in FIG. 6 is similar to the structure of the relationship 500 shown in FIG. 5, where one distinguishing feature is that the GPP 148 and the resource manager 152 are directly communicatively and operably coupled to each other as indicated with the bolded line 610 therebetween.

In at least some embodiments, in operation, the subscriber for the network slice 224 submits the geospatial starting region 206 and the geospatial terminal region 208 through the UAV configuration console 128 such that the swarm of UAVs 205 are configured for transiting through the aerial flight path 210. As previously described, the NCAO manager 146 and the 5G control plane 156 will attempt to cooperate to retrieve the subscriber's IMSI-TAI mapping 510 (generated as previously described) from the UDR 160 where it is maintained in storage. The intention is to facilitate each particular UAV 204 of the swarm of UAVs 205 to transit freely in all of the authorized TAs 504 associated with the data mapping 510 between the IMSIs 508 and TAIs 302. However, in at least some embodiments, if the subscribed service doesn't exist on the geographical route defined by the aerial flight path 210, then the GPP 148 will request the resource manager 152 to deploy or update the requested network slice 224 as subscribed based on the input from the DAF 150 for one or more potential routings.

Under some circumstances, the network slice 224 may be in use for other tasks for the subscriber and there is insufficient resource capacity, e.g., network bandwidth or other resources to accommodate the new tasking request. In such circumstances, in order to maintain the high standards for low latencies, reliable communications, and high data transfer rates, the NCAO manager 146 will not use the unavailable existing network slice 224, and instead instantiates a new network slice (not shown), or updates a different existing network slice, and deploys the new/updated network slice, to accommodate the new tasking request. In some embodiments, the existing network slice that is updated is a portion of the user's subscription. Upon the establishment of the new/updated network slice, the GPP 148 transmits the subscription data mapping 510 between the IMSI 508 and TAIs 302 to the NEF 158, and the NEF 158 inserts the IMSI-TAI mapping 510 in the UDR 160.

Figure 7A:
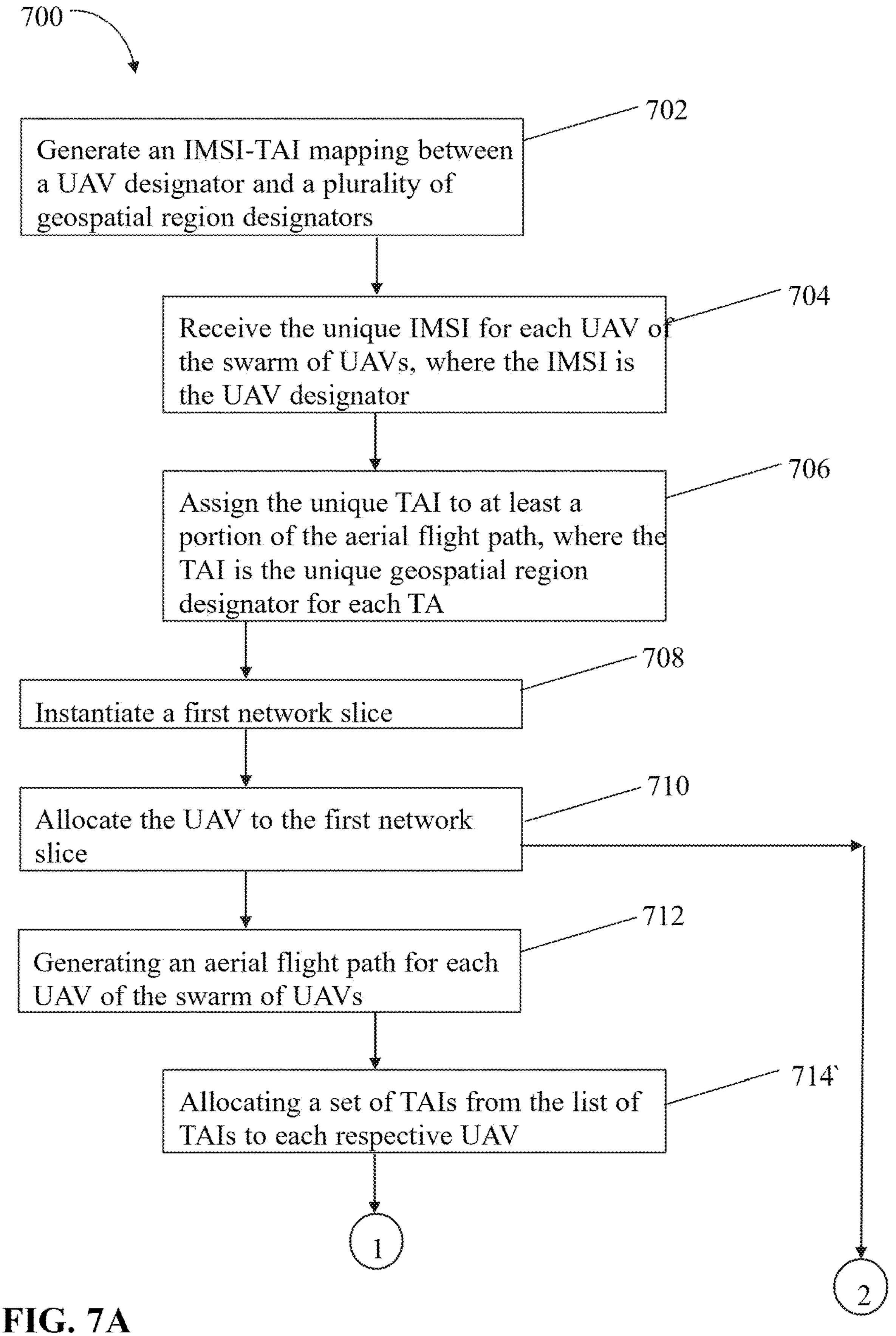
FIG. 7A is a flowchart illustrating a process for enhancing geospatial mobility management of unmanned aerial vehicles (UAVs), in accordance with some embodiments of the present disclosure.

Referring to FIG. 7A, a flowchart is presented illustrating a process 700 for enhancing geospatial mobility management of each of the unmanned aerial vehicles (UAVs) 204 of the swarm of UAVs 205, in accordance with some embodiments of the present disclosure. Also referring to FIGS. 1-6, the process 700 includes generating the IMSI-TAI mapping 510 between a UAV designator and a plurality of geospatial region designators. This is illustrated at step 702. In some embodiments, the step 702 includes the NCAO manager 146 receiving the unique international mobile subscriber identity numbers (IMSIs) 508 that uniquely identify the subscriber and each UAV 204 of the swarm of UAVs 205, where the IMSI 508 is the UAV designator. This is illustrated at step 704. More specifically, in operation, the subscriber to the particular network slice 224 submits the source, i.e., the geospatial starting regions 206 and the destination, i.e., the geospatial terminal region 208 of each UAV 204 of the swarm of UAVs 205 to the NCAO manager 146 through the UAV configuration console 128. Moreover, the subscriber provides the NCAO manager 146 with the IMSI 508 of each of the UAVs 204.

The step 702 also includes assigning a unique tracking area identification (TAI) 302 to at least a portion of the aerial flight path 210, where the TAI 302 is the unique geospatial region designator for each TA 504, and a plurality of TAIs 302 defines the plurality of geospatial region designators. This is illustrated at step 706. The TAIs 302 are generated through the GPP 148 and stored in the UDR 160. As such, the aerial flight path 210 includes a series of interconnected hexagonal units 502 arranged to define a plurality of adjoining TAs 504. Accordingly, the process 700 including the generating step 702 facilitates the to-be-generated aerial flight path 210 for the respective UAVs 204 to include a substantial portion of the necessary authorizations for a seamless transit between the respective TAs, with proper handoffs, i.e., without the need for the mobility registration update procedure and the latencies associated therewith.

In one or more embodiments, the process 700 also includes instantiating a first network slice 224, where the first network slice 224 is associated with the UAV designator (the IMSI 508) and the plurality of geospatial region designators (TAIs 302). This is illustrated at step 708. In some embodiments, the network slices 224 are instantiated 708 during the registration of the respective UAVs 204. Generally, the network slices 224 are previously defined and are known artifacts subscribed to by the user, where the user selects the appropriate subscribed network slice 224 through the UAV configuration console 128. In some embodiments, the data analytics function (DAF) 150 collects data associated with the present status of the infrastructure associated with the 5G network 200 including, without limitation, the present status of the network slices 224 and the TAs 504 on the determined aerial flight path 210. Additionally, in some embodiments, the resource manager 152 facilitates locating the geo-coordinates of relevant objects (e.g., macro cells and small cells) associated with the network slice 224 and the transit of the swarm of UAVs 205 spatially, where the status of such relevant objects is obtained through the DAF 150. Therefore, the DAF 150 and the resource manager 152 cooperate to facilitate instantiating each network slice 224, i.e., allocating the necessary network resources for each instance of network slices 224. In addition, the process 700 includes allocating the UAV to the first network slice 224. This is illustrated at step 710.

In at least some embodiments, the process 700 further includes generating an aerial flight path 210 for each UAV 204 for the swarm of UAVs 205 through a plurality of geospatial regions, i.e., TAs 504, that are at partially determined subject to the network slice 224 and the plurality of geospatial region designators, i.e., TAIs 302. This is illustrated at step 712. In some embodiments, the generating method step 712 includes the AMF 168 allocating a set of TAIs 302 from the list of TAIs 302 to each respective UAV 204 as it is registered with the 5G network 200, where the list of TAIs 302 includes allowed areas and non-allowed areas. This is illustrated at step 714. In addition, during registration of the respective UAVs 204, if any service area restrictions of the UAV 204 are not present with the AMF 168, the AMF 168 fetches the service area restrictions of the UAV 204 from the UDM 162.

Figure 7B:
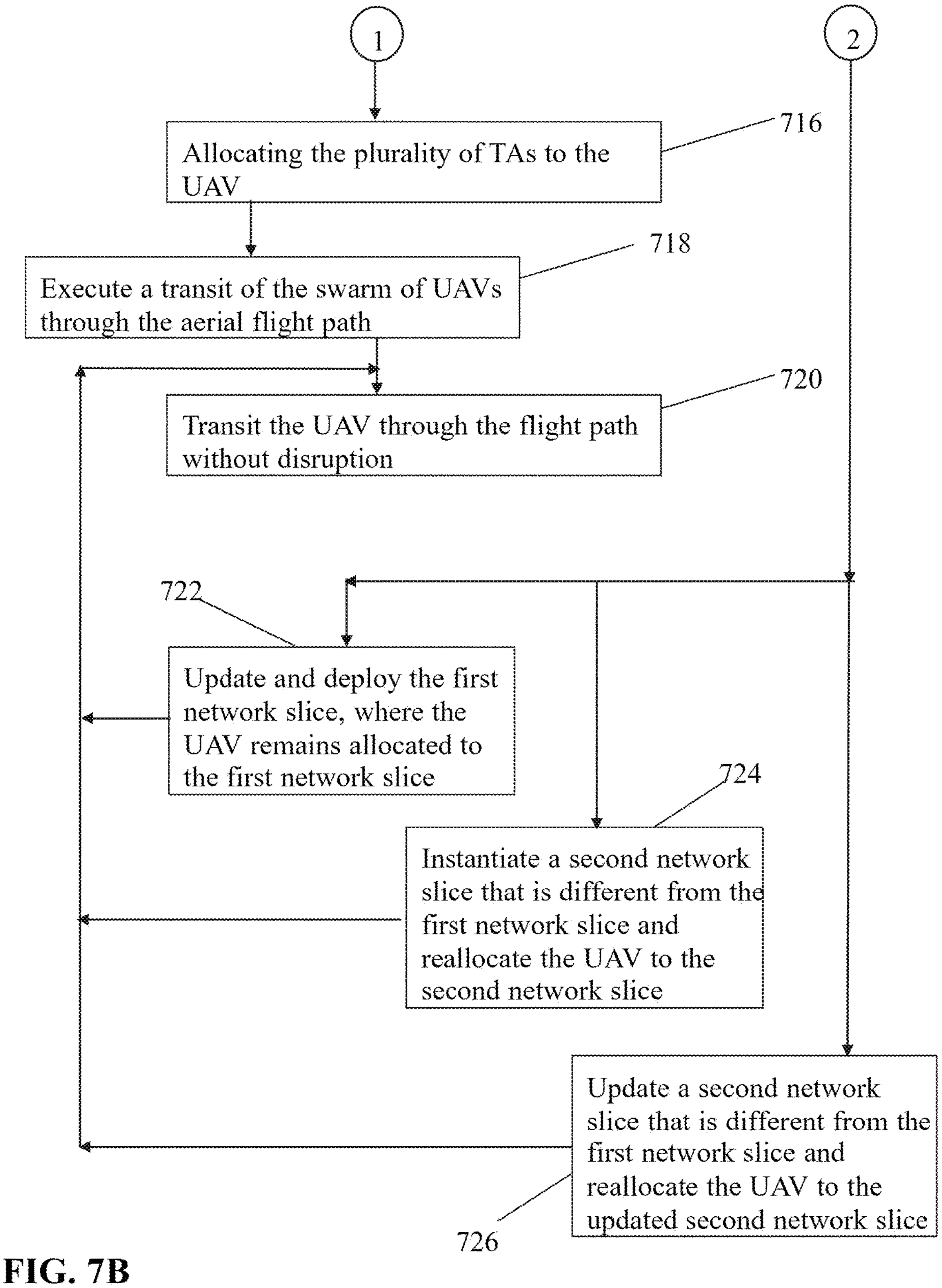
FIG. 7B is a continuation of the flowchart shown in FIG. 7A, in accordance with some embodiments of the present disclosure.

Referring to FIG. 7B, a continuation of the flowchart shown in FIG. 7A is presented, in accordance with some embodiments of the present disclosure. In some embodiments, the allocating method step 714 includes allocating, at the time of registration, by the AMF 168, the plurality of TAs 504 to each UAV 204 of the swarm of UAVs 205. This is illustrated at step 716. Each TA 504 is allocated from the list of TAIs 302 including the authorized and restricted areas, and the plurality of TAs 504 define the aerial flight path 210.

In some embodiments, the process 700 includes executing a transit of the swarm of UAVs 205 through the aerial flight path 210. This is illustrated at step 718. The executing method step 718 includes transiting of the swarm of UAVs 205 through the aerial flight path 210 is executed 718 without disruption. This is illustrated at step 720. More specifically, as the UAVs 204 transit from a present TA 504 to the next TA 504, well-timed, seamless transfers from the present TA 504 to the next TA 504 are executed, thereby elimination executions of the mobility registration update procedure. As such, disruptions to the transit 720 of the UAVs 204 due to poorly executed handoffs are substantially reduced or eliminated to provide the seamless transit of the UAVs 204 through their designated aerial flight path 210. Such disruptions to the transiting 720 of the UAVs 204 is at least partially characterized as the UAVs 204 transiting 720 the aerial flight path 210 without any interruption or delay that would at least temporarily idle the transiting UAV's 204 at a single TA 504 until the proper handoff can be executed through the mobility registration update procedure to allow the UAV 204 transiting to continue.

In one or more embodiments, the process 700 includes features for further leveraging the IMSI-TAI mapping 510 if the first network slice 224 as presently registered in the 5G network 200 is not available in the original configuration. For example, in some circumstances, the first network slice 224 may be in use for other tasks for the subscriber and there is insufficient resource capacity, e.g., network bandwidth or other resources to accommodate the new tasking request. Further, in some circumstances, there may be a conflict between the subscribed service and the geographical route defined by the aerial flight path 210. Moreover, under some circumstances, the network resources associated with the first network slice 224 may be unavailable due to technical issues either known or due to emergent circumstances.

In some first embodiments, in such circumstances, to maintain the high standards for low latencies, reliable communications, and high data transfer rates, the NCAO manager 146 will not use the unavailable first network slice 224 as is. In some embodiments, the GPP 148 will request the resource manager 152 to update the first network slice 224 as subscribed based on the input from the DAF 150 for one or more potential routings. In some embodiments, the first network slice 224 is updated prior to the UAV 204 taking flight through adding network resources thereto and subtracting network resources therefrom, and deploying the updated first network slice 224, where the respective UAV 204 remains allocated to the updated first network slice 224. This is illustrated at step 722. In some embodiments, the updating 722 of the first network slice 224 is executed during the transit of the UAV 204 through the aerial flight path 210.

In some second embodiments, in such circumstances, to maintain the high standards for low latencies, reliable communications, and high data transfer rates, the NCAO manager 146 will not use the unavailable first network slice 224. Rather, a second network slice (not shown) that is different from the first network slice 224 is instantiated and the respective UAVs 204 are reallocated from the first network slice 224 (regardless of how far the first instantiation was executed) or initially allocated (if the first instantiation was never initiated) to the second network slice prior to the UAV 204 taking flight. This is illustrated at step 724. In some embodiments, the second network slice is a portion of the user's subscription. In some embodiments, the instantiation 724 of the second network slice is executed during the transit of the UAV 204 through the aerial flight path 210. Upon the establishment of the second network slice, the GPP 148 transmits the subscription data mapping 510 between the IMSI 508 and TAIs 302 to the NEF 158, and the NEF 158 inserts the IMSI-TAI mapping 510 in the UDR 160.

In some third embodiments, in such circumstances, to maintain the high standards for low latencies, reliable communications, and high data transfer rates, the NCAO manager 146 will not use the unavailable first network slice 224. Rather, a second network slice (not shown) that is different from the first network slice 224 is updated to accommodate the respective UAVs 204 and their respective missions prior to the UAV 204 taking flight. This is illustrated at step 726. In some cases, the updated second network slice is a portion of the user's subscription. In some cases, the updated second network slice is not a portion of this particular subscriber's inventory of network slices. In some embodiments, the updating 726 of the second network slice is executed during the transit of the UAV 204 through the aerial flight path 210. Upon the establishment of the updated second network slice, the GPP 148 transmits the subscription data mapping 510 between the IMSI 508 and TAIs 302 to the NEF 158, and the NEF 158 inserts the IMSI-TAI mapping 510 in the UDR 160.

The embodiments as disclosed and described herein are configured to provide an improvement to the technological field associated with 5G network management. As such, the embodiments described herein integrate the allocation of network slices and aerial flight paths for UAVs into a practical application that improves the functioning of the systems and technologies associated with UAV in-flight management. Accordingly, the embodiments described herein facilitate the aforementioned integration into a practical application of a computer system, computer readable storage medium, and computer-implemented method for enhancing geospatial mobility management of UAVs.

Specifically, as the UAVs transit from the present node to the next node a relatively high speeds, the well-timed transfers from the present node to the next node are enabled through the system, medium, and method as presented herein. More specifically, the geospatial mobility management enhancements presented herein eliminate the execution of the mobility registration update procedure. As such, disruptions to the transit of the UAVs due to poorly executed handoffs are substantially reduced or eliminated to provide the seamless transit of the UAVs through their designated flight path. Such disruptions to the transit of the UAVs is at least partially characterized as the UAVs transiting the flight path without any interruption or delay that would at least temporarily idle the UAV transit at a single point along the transit path until the proper handoff can be executed to allow the UAV transit to continue.

In addition, the elimination of instances of the mobility registration update procedure reduces additional communications traffic through the network. While the present application is primarily directed toward UAVs at or above the speeds defined above, the features of this disclosure may also be applied to other UEs, especially those UEs that may be subject to higher velocities, e.g., and without limitation, planes, helicopters, and high-speed rail trains. Accordingly, the computer system, computer readable storage medium, and computer-implemented method for enhancing geospatial mobility management of UAVs facilitates the aerial flight path for the respective UAVs to include a substantial portion of the necessary authorizations for a seamless transit between the respective TAs, with proper handoffs, i.e., without the need for the mobility registration update procedure and the latencies associated therewith.

Moreover, the embodiments as disclosed and described herein facilitate improved network resource-aware geographical path planning and geospatial mobility management that is required for moving UEs/UAVs subscribing to the URLLC service with the respective high-bandwidth criteria. The initial instantiations, deployments, modifications, and re-instantiations are based on the UAVs' movement and service requirements. In addition, an improved QoS is facilitated through the enhanced and optimized network resource allocations and reduced handover overheads.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, computer readable storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 8:
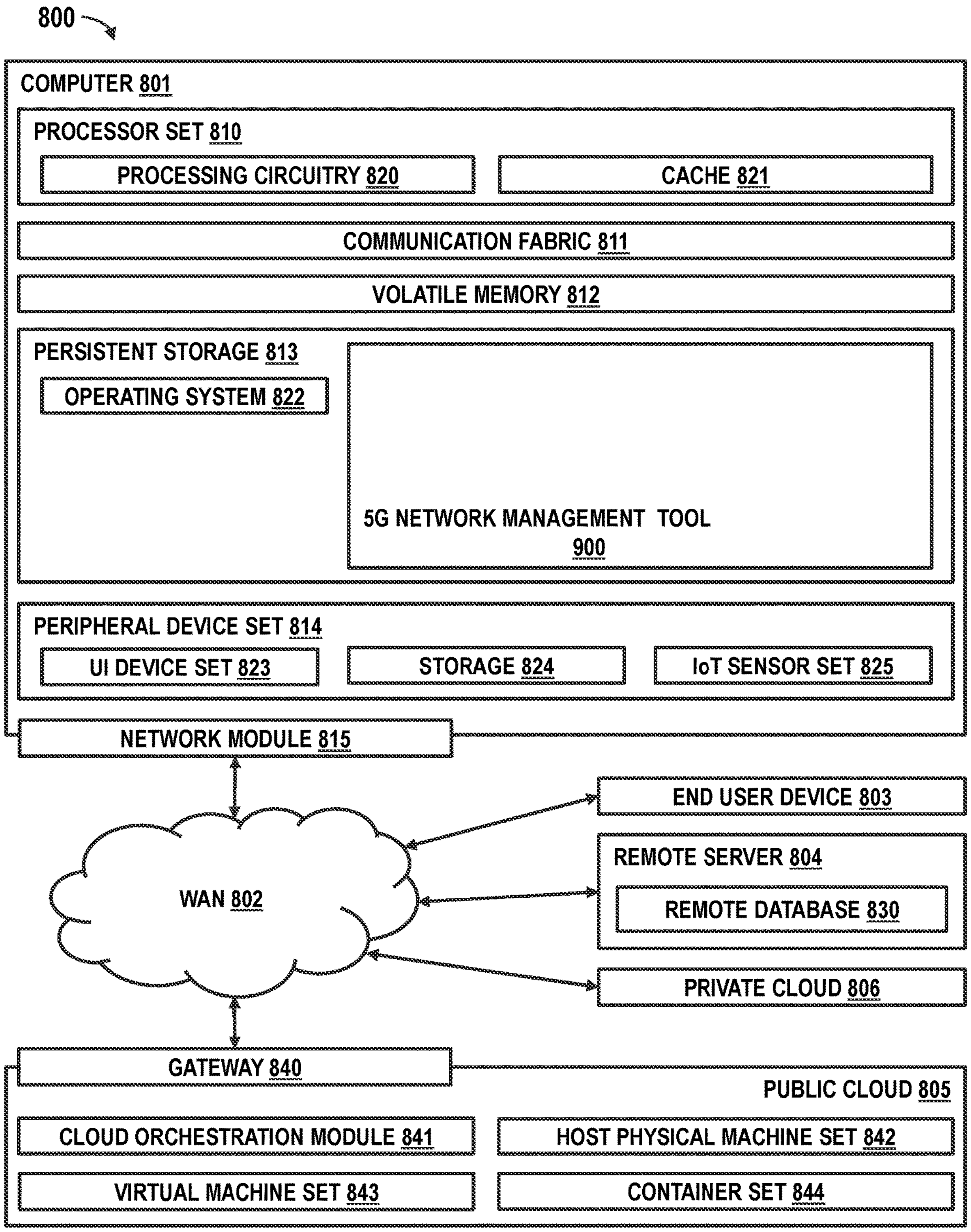
FIG. 8 is as block schematic diagram illustrating an example of a computing environment for the execution of at least some of the computer code involved in performing the disclosed methods described herein, in accordance with some embodiments of the present disclosure.

Referring to FIG. 8, a block schematic diagram is presented illustrating an example of a computing environment for the execution of at least some of the computer code involved in performing the disclosed methods described herein, in accordance with some embodiments of the present disclosure.

Computing environment 800 contains an example of an environment for the execution of at least some of the computer code involved in performing the disclosed methods, such as the 5G network management tool 900 (shown as 140 in FIG. 1). In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

Computer 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

Processor set 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 821 and the other storage media discussed below. The program instructions, and associated data, are accessed by processor set 810 to control and direct performance of the disclosed methods. In computing environment 800, at least some of the instructions for performing the disclosed methods may be stored in block 900 in persistent storage 813.

Communication fabric 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

Persistent storage 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 900 typically includes at least some of the computer code involved in performing the disclosed methods.

Peripheral device set 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

Network module 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the disclosed methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

Remote server 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

Public cloud 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for enhancing geospatial mobility management of unmanned aerial vehicles (UAVs), comprising:
- one or more processing devices;
- one or more memory devices communicatively and operably coupled to the one or more processing devices;
- a 5G network management tool at least partially resident within the one or more memory devices, the 5G network management configured to:
  - generate a mapping between a UAV designator and a plurality of geospatial region designators;
  - instantiate a network slice, wherein the network slice is associated with the mapping of the UAV designator and the plurality of geospatial region designators;
  - generate a flight path for a UAV through a plurality of geospatial regions that is partially determined subject to the network slice and the mapping of the UAV designator and the plurality of geospatial region designators;
  - provide network service to the UAV through the network slice; and
  - execute a transit of the UAV through the flight path.

2. The system of claim 1, wherein the 5G network management tool is further configured to:
- receive a unique international mobile subscriber identity (IMSI) for the UAV, wherein the IMSI is the UAV designator; and
- assign a tracking area identification (TAI) to at least a portion of the flight path, wherein the TAI is the geospatial region designator, and a plurality of TAIs defines the plurality of geospatial region designators.

3. The system of claim 2, wherein the 5G network management tool is further configured to:
- transit the UAV through the flight path without disruption.

4. The system of claim 1, wherein the 5G network management tool is further configured to:
- allocate the UAV to a first network slice;
- update the first network slice, and deploying the updated first network slice, wherein the UAV remains allocated to the first network slice; and
- update a second network slice that is different from the first network slice, and reallocating the UAV to the second network slice.

5. The system of claim 1, wherein the 5G network management tool is further configured to:
- instantiate a first network slice and allocate the UAV to the first network slice; and
- instantiate a second network slice that is different from the first network slice, and reallocate the UAV to the second network slice.

6. The system of claim 1, wherein the 5G network management tool is further configured to:
- assign a tracking area identification (TAI) to each tracking area (TA) of a plurality of TAs, thereby defining a list of TAIs, wherein the TAI is the geospatial region designator, and the list of TAIs defines the plurality of geospatial region designators.

7. The system of claim 6, wherein the 5G network management tool is further configured to:
- allocate the plurality of TAs to the UAV, wherein each TA of the plurality of TAs is allocated from the list of TAIs, the list of TAIs includes authorized and restricted areas, and the plurality of TAs define the flight path.

8. A computer readable storage medium having computer executable instructions that when executed by at least one computing device enhance geospatial mobility management of unmanned aerial vehicles (UAVs), comprising instructions to:
- generate a mapping between a UAV designator and a plurality of geospatial region designators;
- store the mapping on a network control plane;
- instantiate a network slice, wherein the network slice is associated with the mapping of the UAV designator and the plurality of geospatial region designators;
- generate a flight path for a UAV through a plurality of geospatial regions that is partially determined subject to the network slice and the mapping of the UAV designator and the plurality of geospatial region designators;
- provide network service to the UAV through the network slice; and
- execute a transit of the UAV through the flight path.

9. The computer readable storage medium of claim 8, further comprising instructions to:
- receive a unique international mobile subscriber identity (IMSI) for the UAV, wherein the IMSI is the UAV designator; and
- assign a tracking area identification (TAI) to at least a portion of the flight path, wherein the TAI is the geospatial region designator, and a plurality of TAIs defines the plurality of geospatial region designators.

10. The computer readable storage medium of claim 9, further comprising instructions to:
- transit the UAV through the flight path without disruption.

11. The computer readable storage medium of claim 8, further comprising instructions to:
- allocate the UAV to a first network slice;
- update the first network slice, and deploying the updated first network slice, wherein the UAV remains allocated to the first network slice; and update a second network slice that is different from the first network slice, and reallocating the UAV to the second network slice.

12. The computer readable storage medium of claim 8, further comprising instructions to:

instantiate a first network slice and allocate the UAV to the first network slice; and instantiate a second network slice that is different from the first network slice, and reallocate the UAV to the second network slice.

13. The computer readable storage medium of claim 8, further comprising instructions to:

assign a tracking area identification (TAI) to each tracking area (TA) of a plurality of TAs, thereby defining a list of TAIs, wherein the TAI is the geospatial region designator, and the list of TAIs defines the plurality of geospatial region designators; and allocate the plurality of TAs to the UAV, wherein each TA of the plurality of TAs is allocated from the list of TAIs, the list of TAIs includes authorized and restricted areas, and the plurality of TAs define the flight path.

14. A computer-implemented method for enhancing geospatial mobility management of unmanned aerial vehicles (UAVs), comprising:

generating a mapping between a UAV designator and a plurality of geospatial region designators;

instantiating a network slice, wherein the network slice is associated with the mapping of the UAV designator and the plurality of geospatial region designators;

generating a flight path for a UAV through a plurality of geospatial regions that is partially determined subject to the network slice and the mapping of the UAV designator and the plurality of geospatial region designators;

providing network service to the UAV through the network slice; and executing a transit of the UAV through the flight path.

15. The method of claim 14, wherein the generating the mapping between the UAV designator and the geospatial designator comprises:

receiving a unique international mobile subscriber identity (IMSI) for the UAV, wherein the IMSI is the UAV designator; and assigning a tracking area identification (TAI) to at least a portion of the flight path, wherein the TAI is the geospatial region designator, and a plurality of TAIs defines the plurality of geospatial region designators.

16. The method of claim 15, wherein the executing the transit of the UAV through the flight path comprises:

transiting the UAV through the flight path without disruption.

17. The method of claim 14, wherein the instantiating the network slice comprises one or more of:

allocating the UAV to a first network slice;

updating the first network slice, and deploying the updated first network slice, wherein the UAV remains allocated to the first network slice; and updating a second network slice that is different from the first network slice, and reallocating the UAV to the second network slice.

18. The method of claim 14, wherein the instantiating the network slice comprises:

instantiating a first network slice and allocating the UAV to the first network slice; and instantiating a second network slice that is different from the first network slice, and reallocating the UAV to the second network slice.

19. The method of claim 14, wherein the generating the flight path for the UAV comprises:

assigning a tracking area identification (TAI) to each tracking area (TA) of a plurality of TAs, thereby defining a list of TAIs, wherein the TAI is the geospatial region designator, and the list of TAIs defines the plurality of geospatial region designators.

20. The method of claim 19, wherein the generating the flight path for the UAV further comprises:

allocating the plurality of TAs to the UAV, wherein each TA of the plurality of TAs is allocated from the list of TAIs, the list of TAIs includes authorized and restricted areas, and the plurality of TAs define the flight path.

* * * * *